United States Patent [19]

Bomba et al.

[11] Patent Number: 4,706,190

[45] Date of Patent: Nov. 10, 1987

[54] RETRY MECHANISM FOR RELEASING CONTROL OF A COMMUNICATIONS PATH IN DIGITAL COMPUTER SYSTEM

[75] Inventors: Frank C. Bomba, Andover; Stephen R. Jenkins, Acton, both of Mass.

[73] Assignee: Digital Equipment Corporation, Maynard, Mass.

[21] Appl. No.: 755,952

[22] Filed: Jul. 16, 1985

Related U.S. Application Data

[63] Continuation of Ser. No. 534,720, Sep. 22, 1983, abandoned.

[51] Int. Cl.[4] .............................................. G06F 13/42

[52] U.S. Cl. ...................................................... 364/200

[58] Field of Search ... 364/200 MS File, 900 MS File

[56] References Cited

U.S. PATENT DOCUMENTS

| | | | |
|---|---|---|---|
| 3,398,405 | 8/1968 | Carlson et al. | 364/200 |
| 3,528,061 | 9/1970 | Zurcher, Jr. | 364/200 |
| 3,611,303 | 10/1971 | Serracchioli et al. | 364/200 |
| 3,761,883 | 9/1973 | Alvarez et al. | 364/200 |
| 3,988,716 | 10/1976 | Fletcher et al. | 364/200 |
| 3,993,981 | 11/1976 | Cassarino, Jr. et al. | 340/172.5 |
| 3,996,564 | 12/1976 | Kerrigan et al. | 340/172.5 |
| 3,997,875 | 12/1976 | Broeren | 364/200 |
| 4,000,485 | 12/1976 | Barlow et al. | 364/200 |
| 4,030,075 | 6/1977 | Barlow | 364/200 |
| 4,047,162 | 9/1977 | Dorey et al. | 364/900 |
| 4,050,059 | 9/1977 | Williams et al. | 364/200 |
| 4,055,851 | 10/1977 | Jenkins et al. | 364/200 |
| 4,075,692 | 2/1978 | Sorensen et al. | 364/200 |
| 4,099,243 | 7/1978 | Palumbo | 364/200 |
| 4,181,934 | 1/1980 | Marenin | 364/200 |
| 4,214,304 | 7/1980 | Shimizu et al. | 364/200 |
| 4,225,921 | 9/1980 | Hartley et al. | 364/200 |
| 4,225,942 | 9/1980 | Kobs et al. | 364/900 |
| 4,231,086 | 10/1980 | Tarbox et al. | 364/200 |
| 4,232,366 | 11/1980 | Levy et al. | 364/200 |
| 4,296,466 | 10/1981 | Guyer et al. | 364/200 |
| 4,313,161 | 1/1982 | Hardin et al. | 364/200 |
| 4,390,944 | 6/1983 | Quackenbush et al. | 364/200 |
| 4,453,211 | 6/1984 | Askinazi et al. | 364/200 |
| 4,481,573 | 11/1984 | Fukinaga et al. | 364/200 |
| 4,488,217 | 12/1984 | Binder et al. | 364/200 |
| 4,495,571 | 1/1985 | Staplin, Jr. et al. | 364/200 |
| 4,587,609 | 5/1986 | Boudreau et al. | 364/200 |

OTHER PUBLICATIONS

"Computer Buses-A Tutorial"; IEEE Publication No. 0272-1732/84/0800-0007, Gustavson, Aug., 1984.

Computer Engineering: A DEC View of Hardware Systems Design; Chapter 11, John V. Levy, 1978.

"A Systematic Approach to the Design of Digital Bussing Structures", by Kenneth J. Thurber et al., Fall Joint Computer Conference 1972, pp. 719-740.

*Primary Examiner*—Raulfe B. Zache
*Assistant Examiner*—Michael J. Ure
*Attorney, Agent, or Firm*—Finnegan, Henderson, Farabow, Garrett & Dunner

[57] ABSTRACT

When a device on a computer communications bus receives a request to enter into a transaction and is not yet ready to perform the transaction, it sends a retry signal to the requesting device to indicate to it that it should terminate the transaction that it has initiated. If the responding device may later be ready to engage in the transaction if the transaction is initiated again some time in the future, the signal is a retry signal and differs from the signal that the requesting device would receive if the transaction were to be terminated for some other reason. As a result, the master device can be arranged to re-initiate only those transactions for which there is a likelihood that they can be carried out to completion when they are attempted again.

4 Claims, 34 Drawing Figures

BSY AND NO ARB CONTROL STATE DIAGRAM

KEY:
NO ARB / BSY
BOTH LOW ASSERTED

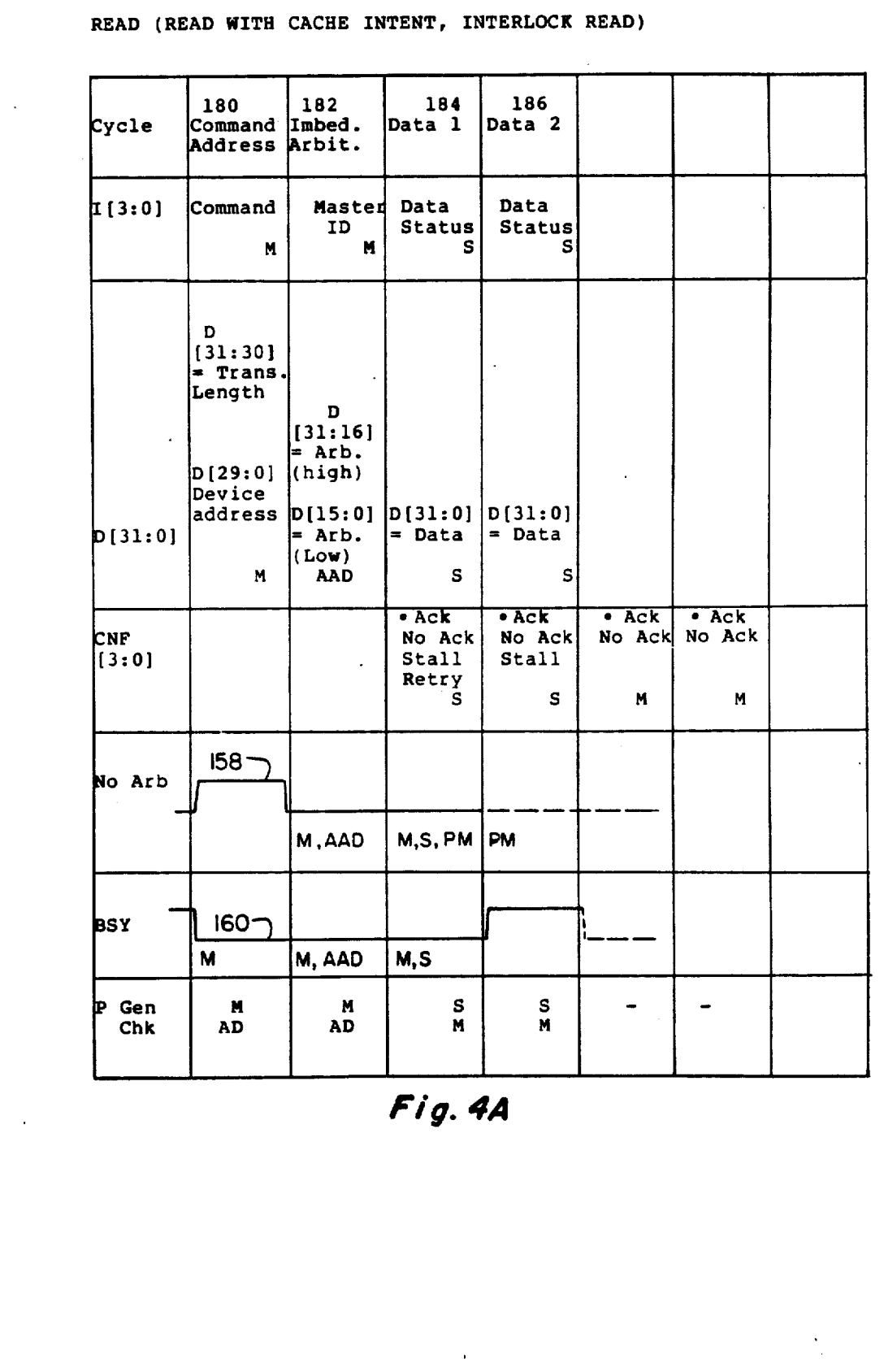

READ (READ WITH CACHE INTENT, INTERLOCK READ)

| Cycle | 180 Command Address | 182 Imbed. Arbit. | 184 Data 1 | 186 Data 2 | | | |
|---|---|---|---|---|---|---|---|
| I[3:0] | Command M | Master ID M | Data Status S | Data Status S | | | |
| D[31:0] | D [31:30] = Trans. Length<br>D[29:0] Device address M | D [31:16] = Arb. (high)<br>D[15:0] = Arb. (Low) AAD | D[31:0] = Data S | D[31:0] = Data S | | | |
| CNF [3:0] | | | • Ack No Ack Stall Retry S | • Ack No Ack Stall S | • Ack No Ack M | • Ack No Ack M | |
| No Arb | 158 | M, AAD | M,S, PM | PM | | | |
| BSY | 160 M | M, AAD | M,S | | | | |
| P Gen Chk | M AD | M AD | S M | S M | - | - | |

*Fig. 4A*

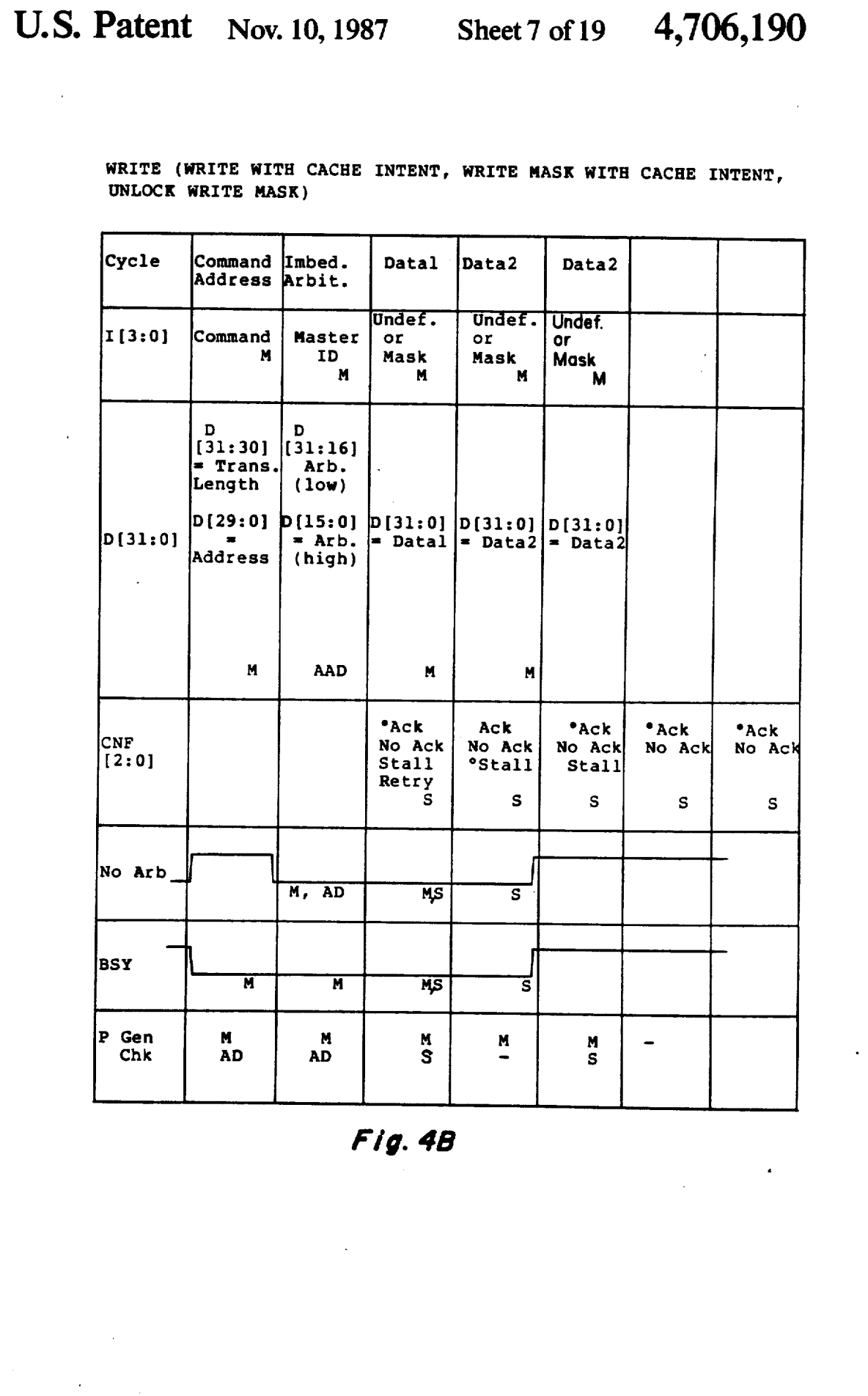

WRITE (WRITE WITH CACHE INTENT, WRITE MASK WITH CACHE INTENT, UNLOCK WRITE MASK)

| Cycle | Command Address | Imbed. Arbit. | Data1 | Data2 | Data2 | | |
|---|---|---|---|---|---|---|---|
| I[3:0] | Command M | Master ID M | Undef. or Mask M | Undef. or Mask M | Undef. or Mask M | | |
| D[31:0] | D [31:30] = Trans. Length<br>D[29:0] = Address<br>M | D [31:16] Arb. (low)<br>D[15:0] = Arb. (high)<br>AAD | D[31:0] = Data1<br>M | D[31:0] = Data2<br>M | D[31:0] = Data2 | | |
| CNF [2:0] | | | •Ack No Ack Stall Retry S | Ack No Ack •Stall S | •Ack No Ack Stall S | •Ack No Ack S | •Ack No Ack S |
| No Arb | | M, AD | MS | S | | | |
| BSY | M | M | MS | S | | | |
| P Gen Chk | M AD | M AD | M S | M - | M S | - | |

*Fig. 4B*

Invalidate

| Cycle | Command Address | Imbed. Arb | Datal | | | | |
|---|---|---|---|---|---|---|---|
| I[3:0] | Command | Master ID M | - | | | | |
| D[31:0] | D [31:30] Data Lgth Code<br>D[29:0] Data Start. Add.<br>M | D [31:16] = Arb. (low)<br>D[15:0] Arb. (High)<br>M | - | | | | |
| CNF [2:0] | | | •Ack No Ack S | | | | |
| No Arb | | M,AAD | | | | | |
| Bsy | M | M | | | | | |
| P. Gen Chk. | M AD | M AD | - | | | | |

Fig. 4C

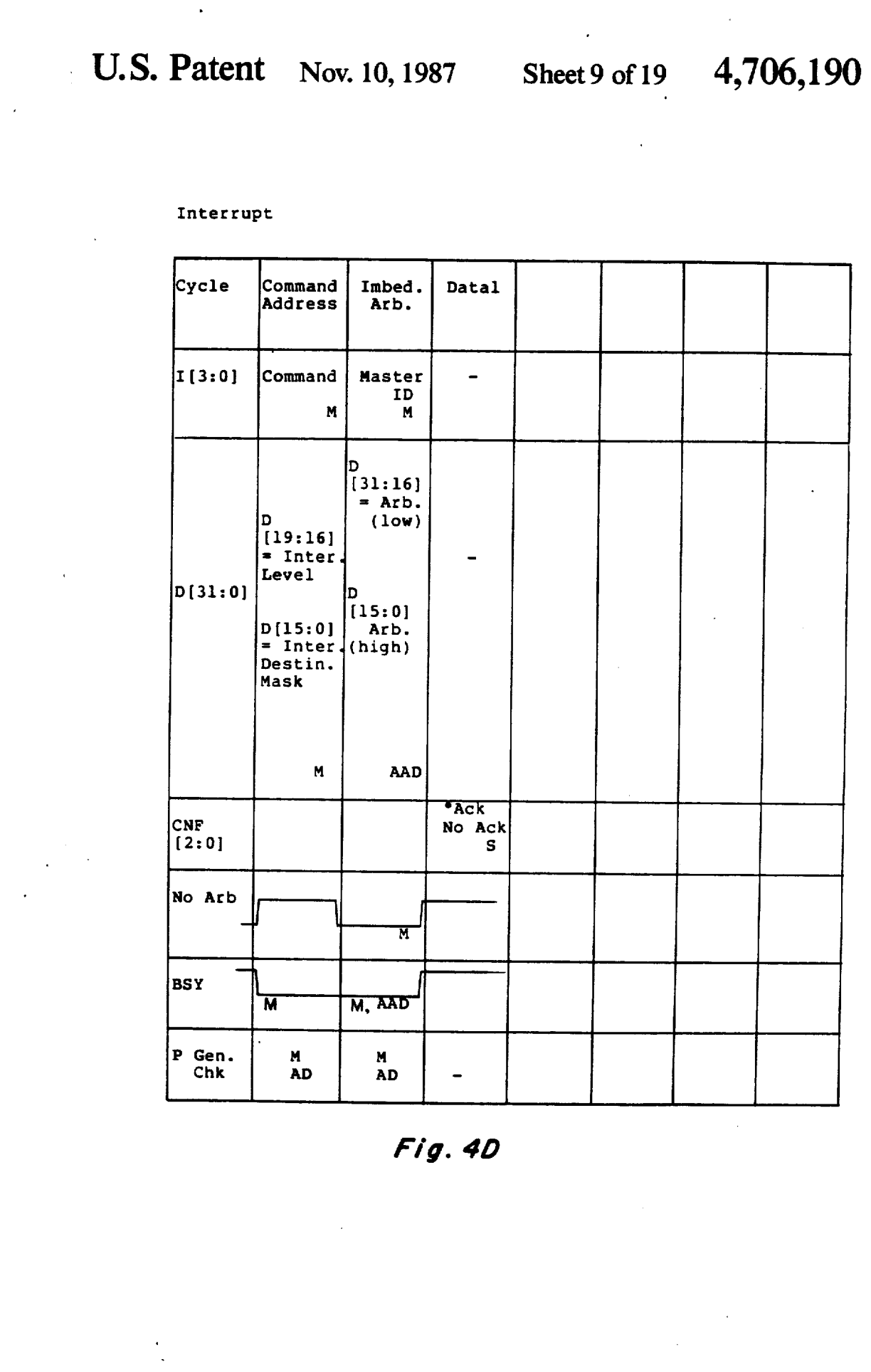

Interrupt

| Cycle | Command Address | Imbed. Arb. | Datal | | | | |
|---|---|---|---|---|---|---|---|
| I[3:0] | Command M | Master ID M | - | | | | |
| D[31:0] | D [19:16] = Inter. Level<br>D[15:0] = Inter. Destin. Mask<br>M | D [31:16] = Arb. (low)<br>D [15:0] Arb. (high)<br>AAD | - | | | | |
| CNF [2:0] | | | •Ack No Ack S | | | | |
| No Arb | | M | | | | | |
| BSY | M | M, AAD | | | | | |
| P Gen. Chk | M AD | M AD | - | | | | |

*Fig. 4D*

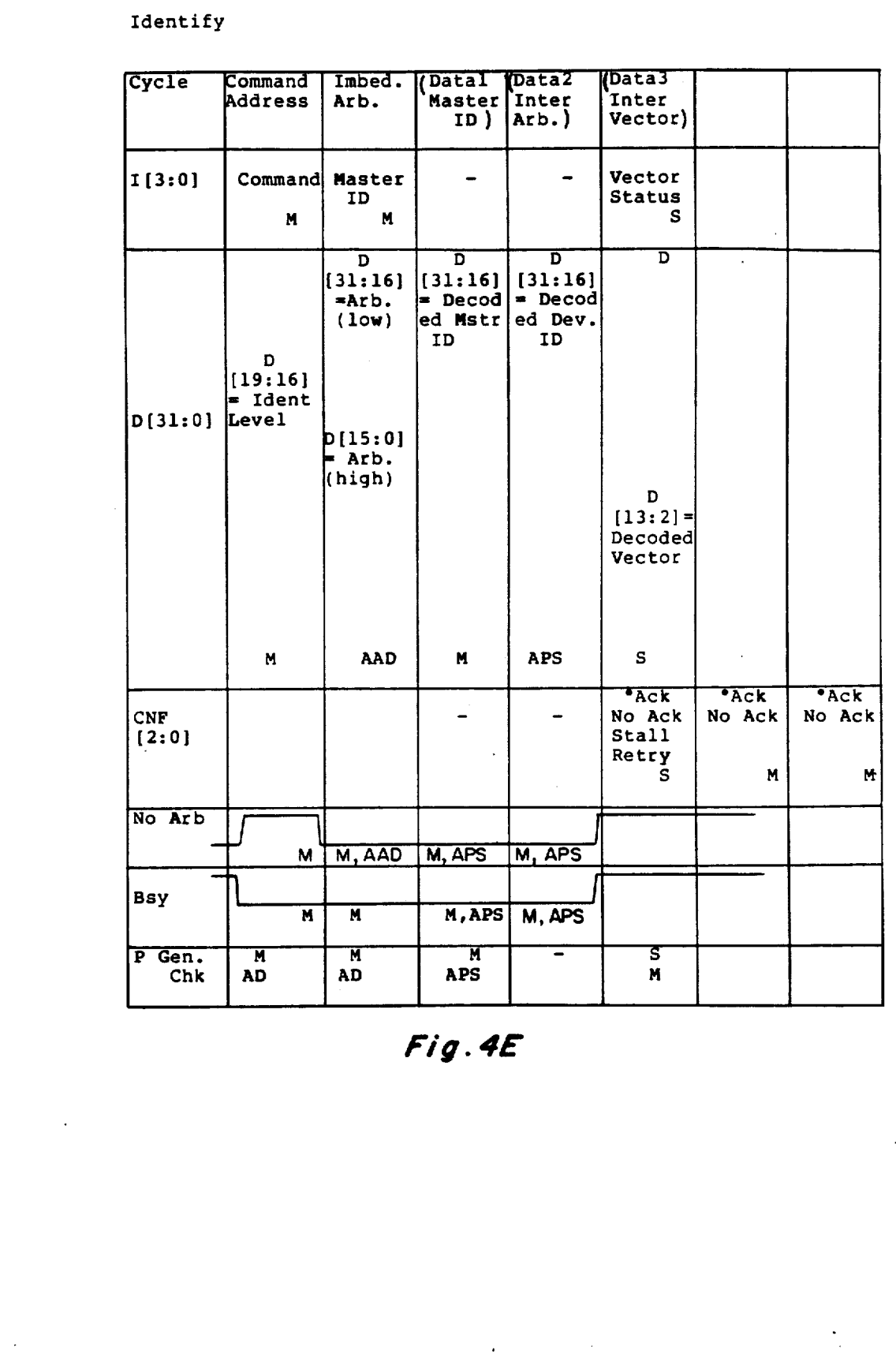

Identify

| Cycle | Command Address | Imbed. Arb. | (Data1 Master ID) | (Data2 Inter Arb.) | (Data3 Inter Vector) | | |
|---|---|---|---|---|---|---|---|
| I[3:0] | Command M | Master ID M | - | - | Vector Status S | | |
| D[31:0] | D [19:16] = Ident Level M | D [31:16] =Arb. (low) D[15:0] = Arb. (high) AAD | D [31:16] = Decoded Mstr ID M | D [31:16] = Decoded Dev. ID APS | D D [13:2]= Decoded Vector S | | |
| CNF [2:0] | | | - | - | •Ack No Ack Stall Retry S | •Ack No Ack M | •Ack No Ack M |
| No Arb | M | M, AAD | M, APS | M, APS | | | |
| Bsy | M | M | M,APS | M, APS | | | |
| P Gen. Chk | M AD | M AD | M APS | - | S M | | |

*Fig.4E*

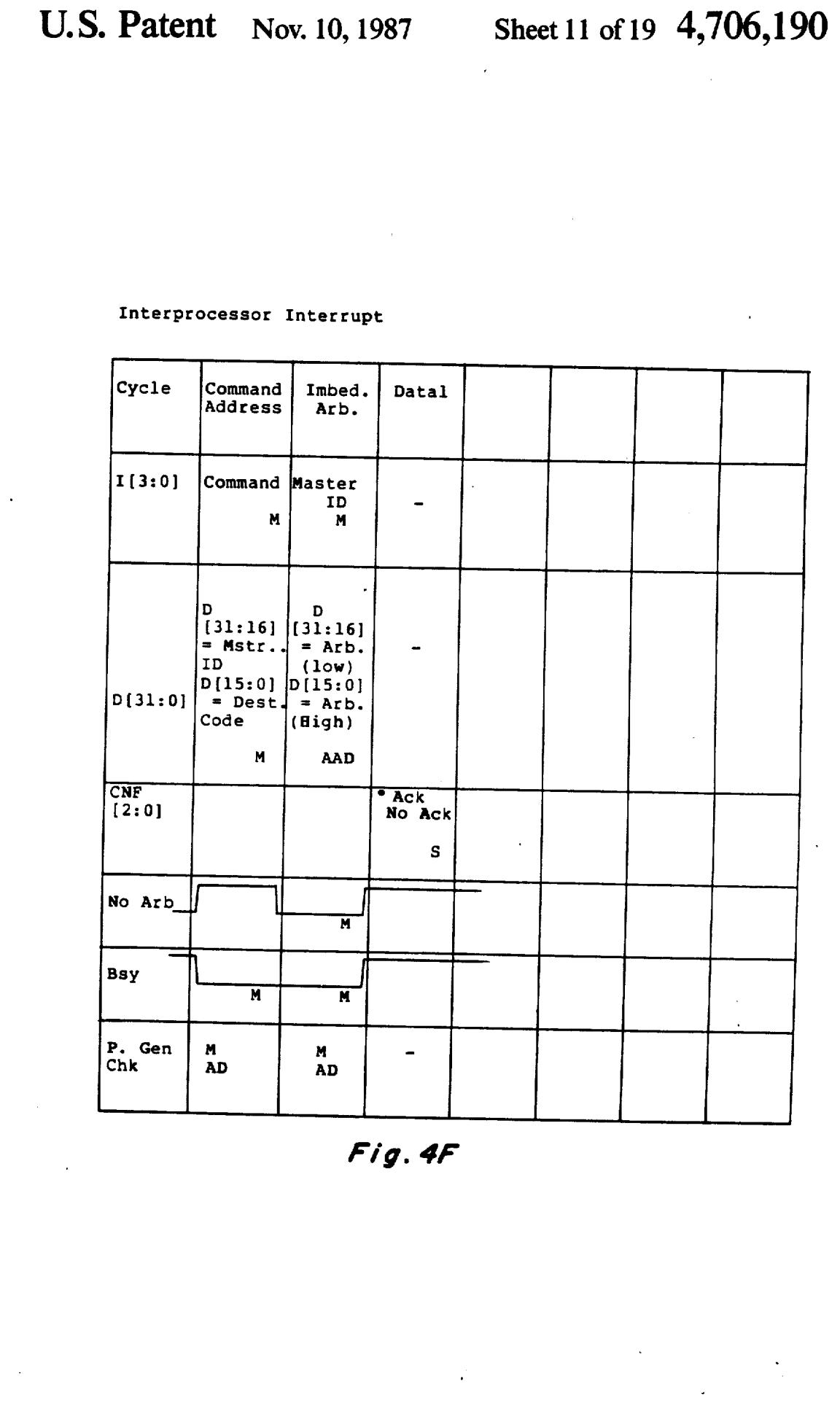

Interprocessor Interrupt

| Cycle | Command Address | Imbed. Arb. | Datal | | | | |
|---|---|---|---|---|---|---|---|
| I[3:0] | Command M | Master ID M | - | | | | |
| D[31:0] | D [31:16] = Mstr.. ID D[15:0] = Dest. Code M | D [31:16] = Arb. (low) D[15:0] = Arb. (High) AAD | - | | | | |
| CNF [2:0] | | | • Ack No Ack S | | | | |
| No Arb | | M | | | | | |
| Bsy | M | M | | | | | |
| P. Gen Chk | M AD | M AD | - | | | | |

*Fig. 4F*

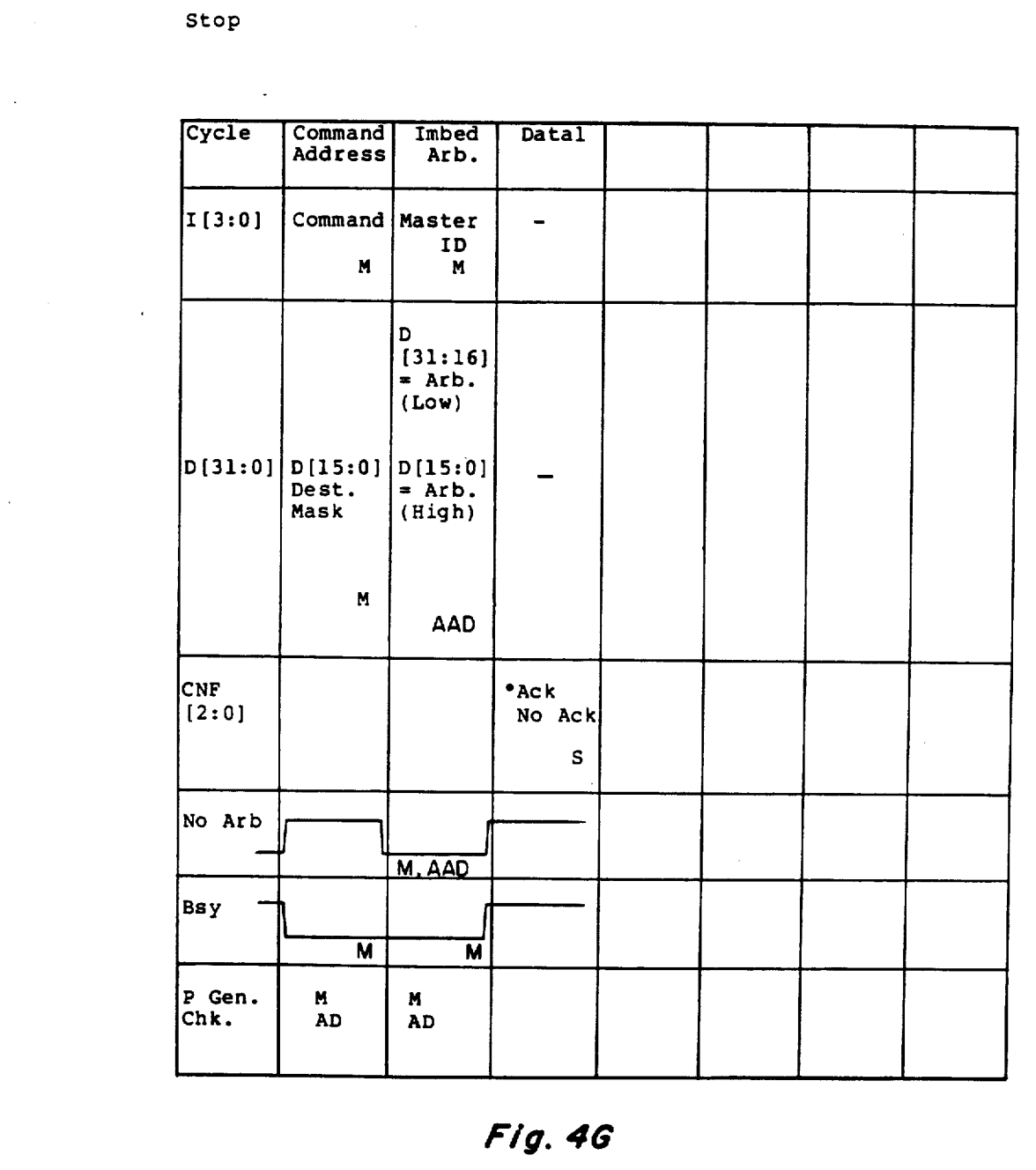

Stop

| Cycle | Command Address | Imbed Arb. | Data1 | | | | |
|---|---|---|---|---|---|---|---|
| I[3:0] | Command<br>M | Master ID<br>M | - | | | | |
| D[31:0] | D[15:0] Dest. Mask<br>M | D [31:16] = Arb. (Low)<br>D[15:0] = Arb. (High)<br>AAD | – | | | | |
| CNF [2:0] | | | •Ack<br>No Ack<br>S | | | | |
| No Arb | | M, AAD | | | | | |
| Bsy | M | M | | | | | |
| P Gen. Chk. | M<br>AD | M<br>AD | | | | | |

*Fig. 4G*

Broadcast

| Cycle | Command Address | Imbed. Arb. | Data1 | Data2 | | | |
|---|---|---|---|---|---|---|---|
| I[3:0] | Command M | Master ID M | - | - | | | |
| D[31:0] | D [31:0] = Data Length Code<br>D[15:0] = Dest. Mask M | D [31:16] = Arb. (Low)<br>D[15:0] = Arb. (High) AAD | D[31:0] Message M | D[31:0] Message M | | | |
| CNF [2:0] | | | •Ack No Ack S | •Ack No Ack S | •Ack No Ack S | •Ack No Ack S | |
| No Arb | | M,AAD | M,S | | | | |
| Bsy | M | M | M,S | | | | |
| P. Gen. Chk | M AD | M AD | M S | M S | | | |

*Fig. 4H*

Command Codes:

| | |
|---|---|
| 0000 | IPINTR |
| 0001 | BROADCAST |
| 0010 | INVALIDATE |
| 0011 | STOP |
| 0101 | - |
| 0110 | IDENT |
| 0111 | INTR |
| 1000 | WRITE MASK WITH CACHE INTENT |
| 1001 | UNLOCK WRITE MASK WITH CACHE INTENT |
| 1010 | WRITE WITH CACHE INTENT |
| 1011 | WRITE |
| 1100 | READ WITH CACHE INTENT |
| 1101 | INTERLOCK READ WITH CACHE INTENT |
| 1110 | READ |
| 1111 | - |

Fig. 5A

Data Status Codes

| | |
|---|---|
| 0X00 | - |
| 0X01 | READ DATA |
| 0X10 | CORRECTED READ DATA |
| 0X11 | READ DATA SUBSTITUTE |
| 1X00 | - |
| 1X01 | READ DATA (DON'T CACHE) |
| 1X10 | CORRECTED READ DATA (DON'T CACHE) |
| 1X11 | READ DATA SUBSTITUTE (DON'T CACHE) |

Fig. 5B

Data Length Codes

| | |
|---|---|
| 00 | - |
| 01 | Longword (32 bits) |
| 10 | Quadword (64 bits) |
| 11 | Octaword (128 bits) |

Fig. 5C

Response Codes

| | |
|---|---|
| 000 | - |
| 001 | Retry |
| 010 | Stall |
| 011 | - |
| 100 | Ack |
| 101 | - |
| 110 | - |
| 111 | No Ack |

Fig. 6

Interrupt Destination Register

Interprocessor Interrupt Mask Register

Interprocessor Interrupt Destination Register

Interprocessor Interrupt Source Register

RETRY MECHANISM FOR RELEASING CONTROL OF A COMMUNICATIONS PATH IN DIGITAL COMPUTER SYSTEM

This application is a continuation of application Ser. No. 06/534,720, filed Sept. 9, 1983, now abandoned.

BACKGROUND OF THE INVENTION

A. Field of the Invention

The invention relates to digital computer architecture and, more particularly, to circiutry for interconnecting for communication with each other such diverse devices as processors, memory (main memory) and I/O devices such as mass storage (e.g. disks and tapes), console terminals, printers, and other such devices in a digital computer system. The particular invention claimed herein relates to an improved mechanism for releasing control of a communications path in a digital computer system when a device on the communications path is unable immediately to respond to a request by another device on the communications path to enter into a transaction with it.

B. Prior Art

As the cost of digital computer systems and their components continues to decrease, more and more different types of data handling devices are being interconnected into these systems. The devices have widely varying characteristics with respect to speed (i.e., the rate at which they can accept or transmit data), required control information, data format, and other such characteristics, yet they must communicate with each other. For example, processors must often communicate with main memory (very high speed), mass storage devices such as disk memory (high speed), and output devices such as printers (very low speed). An important aspect of ane interconnecting means is its ability to support arbitration among the competing demands of devices wishing to communicate with each other. Some form of arbitration must be performed to grant a request for access to the communications path, and thus it is essential that the arbitration process be efficient, since it may otherwise consume an undue portion of the computer system's resources. Further, it is generally desirable that the arbitration process provide some measure of flexibility in allocating the communications path among the requesting devices. In environments which allow a wide variety of devices to be attached to the communications path, particularly in environments which additionally allow the connection of multiple processors to the communications path, the competing demands on the arbitration mechanism often lead to undesirable constraints on system operation and flexibility.

Another important aspect of an interconnecting means is its support of interrupts. The manner in which these interrupts are posted often results in significant restrictions on the achievable flexibility of device attachment to the communications path.

In addition to providing communications among devices attached to a single central processor, it is frequently desirable to provide access between such devices and one or more additional processors, as well as between the several processors themselves. This requirement of communication among processors adds substantially increased complexity to the interconnection problem because of the need to insure coordinated operation. One aspect of interprocessor communications that requires particular attention is the problem caused by utilization of caches on one or more of the processors. Such caches can cause processing errors if appropriate steps are not taken to insure that access to the cache is allowed only when the cached data is "valid", that is, has not been altered in main memory since it was cached. If cache control is not performed efficiently, the performance of the system as a whole may be significantly degraded.

BRIEF DESCRIPTION OF THE INVENTION

A. Objects of the Invention

Accordingly, it is an object of the invention to provide an improved means for interconnecting diverse devices in a digital computer system.

Further, it is an object of the invention to provide an improved means for interconnecting devices in a digital computer system that allows attachment of a wide variety of devices with minimal attachment restrictions.

Still a further object of the invention to provide an improved means for interconnecting devices that allows termination of a transaction in an efficient manner.

Yet another object of the invention is to provide a means for interconnecting devices in a digital computer system that allows devices on an "interlocked" type path that are unable to provide a requested response within a given time to terminate a transaction.

B. SUMMARY OF THE INVENTION

This application is directed to one of several related aspects of the interconnecting means.

It is one of five related applications, filed concurrently herewith and whose contents are expressly incorporated herein, namely:

Arbitration Mechanism for Assigning Control Of A Communications Path In A Digital Computer System U.S. patent application Ser. No. 534, 829, filed Sept. 22, 1983, by Frank C. Bomba, William D. Strecker and Stephen R. Jenkins Message Oriented Interrupt Mechanism For Multiprocessor Systems U.S. patent application Ser. No. 534,652, filed Sept. 22, 1983, by Frank C. Bomba and Stephen R. Jenkins Cache Invalidation Mechanism For Multiprocessor Systems U.S. patent application Ser. No. 534,782, filed Sept. 22, 1983, by Frank C. Bomba, Dileep P. Bhandarkar, J. J. Grady, Stanley A. Lackey, Jr., Jeffrey W. Mitchell and Reinhard Schumann Control Mechanism For Multiprocessor Systems, U.S. patent application Ser. No. 534,781, filed Sept. 22, 1983, by Frank C. Bomba, Stephen R. Jenkins, Reinhard Schumann and Paul Binder Of the above-referenced applications, pages 50 et seq. of U.S. Pat. No. 534,781 may be consulted for details of how control of the communications path is allocated among devices on the path. Pages 50 et seq. of U.S. Pat. No. 534,782 may be consulted for details of the cache-invalidation system. Pages 49 et seq. of U.S. Pat. No. 534,652 may be consulted for details of the interrupt operation. Pages 49 et seq. of U.S. Pat. No. 534,829 contain details of the arbitration scheme.

Specifically, it is directed to the means by which devices unable to provide a requested response to a transaction may cause termination of the transaction for the moment, thereby freeing the communications path for other transactions. Because of the interrelation among the separate aspects of the complete system, the structure of the complete system will be described as a whole first, and those aspects specific to the present invention will then be described in somewhat further detail. The claims set forth herein define the specific invention of the present application.

1. General Description Of The Interconnecting Means

The interconnecting means described herein is associated with, and preferably forms part of, each device to be interconnected. It controls the transmission and reception of signals on a communications path (e.g., a parallel wired bus) interconnecting each of the devices. The interconnecting means provides uniform control of communications among the devices interconnected by the communications path. These devices are connected in parallel to the communications path, and their operation is independent of physical placement on the path. Each device connected to the communications path is assigned an identification number ("ID") which is used for a number of purposes as described hereafter. In one implementation of the interconnecting means, the assignment is made by a physical plug inserted into the device and wire to specify the identification number. Since this physical plug may be moved from slot to slot, there is no logical dependency between the device and the slot in which it resides. This number is loaded into a control register during system initialization, and is thereafter available for use by the device.

The interconnecting means implements a specific set of commands providing efficient communication between devices. These commands are implemented and transmitted in a number of different operations (hereinafter called "transactions"). Each transaction is subdivided into a number of cycles, including a Command/Address cycle in which the operation code for the particular transaction (e.g., Read, Write, Interrupt, etc.) is transmitted over the bus to other devices, together with information identifying the devices to which the command is directed or providing other information pertinent to the command; an Imbedded Arbitration cycle for identifying the device which will next be allowed access to the communications path; and one or more data cycles in which user data (i.e., the ultimate object of the processing) or other information is transmitted. The transaction signals are transmitted over the communications path via separate groups of lines referred to herein as Information Transfer Class lines, Response Class lines, Control Class lines, and Power Class lines. Except for Time and Phase Signals (described later) these signals are detected as being asserted whenever one or more interconnecting means asserts them. The Information Transfer Class lines, in turn, comprise Information, Data and Parity lines, and transmit command, data status and certain other information used in the transaction.

The Response Class Lines provide positive confirmation of error-free reception, as well as additional responses to control or alter the transaction. This error monitoring significantly contributes to system reliability, requires little or no additional bandwidth, and allows the responding device to alter the normal progress of the transaction, thus contributing greatly to system flexibility. For example, a device which requires additional time to respond to a command directed to it beyond that normally provided for by the command may utilize one or more of the response signals to delay completion of the transaction (within predetermined limits) until the device is ready to respond, or may notify the device of its inability to respond at that time and thus free the communications paths for other transactions.

A set of control signals is generated and utilized by the interconnecting means in each device to provide efficient and orderly transfer of access to the communications path from one device to another. Additionally, each device generates local timing signals from a common system clock to thereby insure synchronous operation. These signals, as well as test control signals, are also transmitted on separate lines over the bus. Finally, the devices monitor the status of the AC and DC power within the system, and provide signals indicating the status of these power sources so that appropriate action may be taken when necessary.

The interconnecting means described herein is unusually powerful and versatile, and readily lends itself to economical manufacture by large scale integration techniques currently available. This results from the relatively limited number of physically separate wires required to carry the command, control, information and data signals among devices, arising from the efficient selection and distribution of functions among these lines. Nontheless, the interconnecting means imposes essentially no restrictions on the physical placement of the devices attached to it. Further, it allows interconnection of a wide variety of devices, and efficiently accommodates both single-processor and multi-processor configurations.

2. General Description of the Specific Invention Defined Herein

In accordance with the invention specifically defined in this application, a master device—i.e., a device that has obtained control of the communications path—places signals on the communications path to specify the intended transaction and designate the device or devices with which it is to engage in the transaction. Typically, the designated device indicates that it has received the command and can perform it by placing a particular response signal, denominated an acknowledgment signal, on the communications path. The master device senses the acknowledgment signal and proceeds with the steps of the transaction. In contrast, if the designated device for some reson did not receive the command or was not present to do so, a different response, denominated a no-acknowledgment signal, is present on the commuications path, and the master device does not proceed wiht the steps of the transaction.

The improvement of the present invention is the provision of a further type of signal, called a retry signal, that causes the master device to break off the transaction but to reinitiate it at a later time. This increases the flexiblity of this type of system, as can be appreciated when one considers the response of a master of a master device to a no-acknowledgment signal. A no-achnowledgment signal is ordinally an indication that an error has occured; the device with which the master device attempted the transaction has incorrectly received signals or has failed to respond to them properly. Consequently, it would be inefficient for the master device to continue attempting to perform a transaction wiht that particular device. Without the retry mechanism of the present invention, however, the reason for the absence of an acknowledgment signal might also be that the device received the request to enter into the transaction but was not in a state in which performance of the transaction was possible within an acceptable period of time.

Accordingly, failure of the master device to attempt the transaction again might be inappropriate. Therefore, relatively elaborate steps might have to be taken to determine what caused the no-acknowledgement signal, and this would reduce the speed of the system. Without the improvement of the present invention, therefore, there is some lack of flexibility in the communication path; either its use must be restricted to devices that will always be ready to engage in a transaction when the transaction is requested, or some scheme must be employed to identify the reason for a no-acknowledgment signal.

According to the present invention, the flexiblity of the communications path is improved because slave devices that sometimes are and sometimes are not ready to engage in a transaction can respond with a retry signal to indicate that, although performance of the transaction is not currently desirable, the master device should attempt to engage in the transaction again at a later time. Thus, the master device is able to distinguish between transactions that are likely to be able to be completed at a later time and those that are not likely to be completed at all. This greatly increases the flexibility of the communications path.

BRIEF DESCRIPTION OF THE DRAWINGS

The foregoing and other and further objects and features of the invention will more readily be understood from the following detailed description of the invention, when taken in conjunction with the accompanying drawings, in which:

FIG. 4A is a table setting forth the structure of a read transaction utilized by the interconnecting means;

FIG. 4B is a table setting forth the structure of a write transaction utilized by the interconecting means;

FIG. 4C is a table setting forth the structure of an invalidate transaction utilized by the interconnecting means;

FIG. 4D is a table setting forth the structure of an interrupt transaction utilized by the interconnecting means;

FIG. 4E is a table setting forth the structure of an identify command utilized by the interconnected means;

FIG. 4F is a table setting forth the structure of an interporcessor-interrupt transaction utilized by the interconnecting means;

FIG. 4G is a table setting forth the structure of a stop transaction utilized by the interconnecting means;

FIG. 4H is a table setting forth the structure of a broadcast transaction utilized by the interconnecting means;

FIG. 5A is a table summarizing the command codes of the interconnecting means, while FIG. 5B is a table summarizing the data status codes of the interconnecting means;

FIG. 5C is a summary of data length codes of the interconnecting means.

FIG. 6 is a Response Code Summary table;

1. DETAILED DESCRIPTION OF THE PREFERRED EMBODIMENTS

Figure 1A:
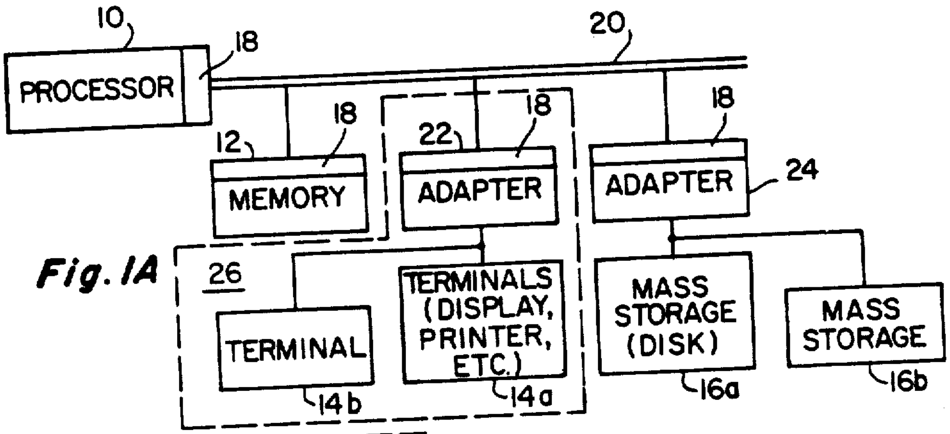
FIGS. 1A–1C are block and line diagrams of various processor and device configurations which can be implemented with the interconnecting means described herein.
Figure 1B:
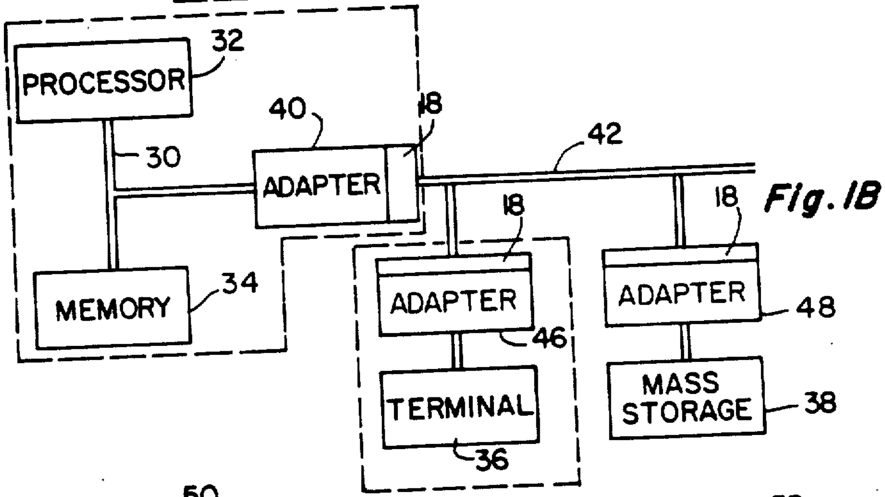

FIG. 1A illustrates the utilization of the interconnecting means described herein in a cofnguration typical of small and relatively inexpensive computer systems. As there illustrated, a processor 10, memory 12, terminals 14 and mass storage units (disks) 16 are interconnected to each other via interconnecting means 18 and a communications path 20. In the case of processor 10 and memory 12, the interconnecting means 18 are preferably located integrally within the device and thus provide the communications interface to the device. In the case of the terminals 14 and storage units 16, intermediate adapters 22, 24, respectively, may be provided in order to allow the connection of a number of terminal or storage devices to a single interconnecting means 18. The adapters serve to interface the communications path 20 to the remainder of the device. As utilized herein, the term "device" denotes one or more entities connected to the communications path by a common interconnecting means. Thus, in FIG. 1A, the terminals 14 and adapter 22 comprise a single device 26; similarly, processor 10 and main memory 12 are each devices. In FIG. 1B, the processor 32 and memory 34, together with adapter 40, comprise a single device.

In FIG. 1A, it will be noted that the processor 10 shares the memory 12 with the other devices connected to communications path 20. This results in lower system cost, but limits system speed because of the need to share the path 20. In FIG. 1B, this problem is resolved by providing a separate memory path 30 between a processor 32 and a memory 34. The processor and memory are then connected to terminal devices 36 and mass storage devices 38 via an adapter 40, a path 42, and adapters 46 and 48. The adapter 40 has an interconnecting means 18 integral with it and connecting the adapter to the path 42. Similarly adapters 46 and 48 each have an interconnecting means 18 integral therewith and connecting them to the path 42. A system of this type offers higher performance, but at a higher cost. However, it is still fully compatible with the interconnecting means described herein.

Figure 1C:
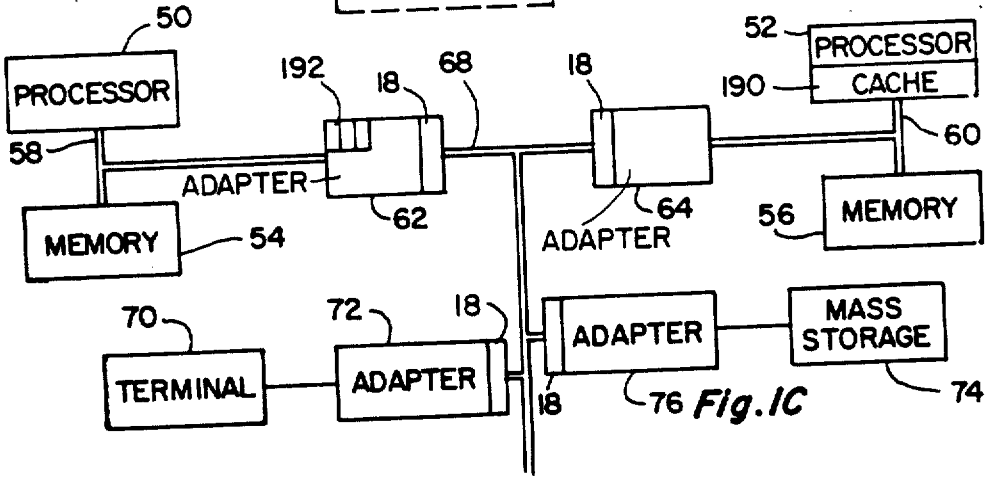

Finally, FIG. 1C illustrates the use of the device interconnecting means in a multi-processor system. In this Figure, processors 50 and 52 are connected to primary memories 54, 56, respectively, by memory paths 58, 60, respectively. The processor-memory pairs, in turn, are connected to the remainder of the system via adapters 62, 64, respectively, having interconnecting means 18 incorporated integrally therewith and interconnected by path 68. A cache memory 190 is associated with one of the processors, i.e., processor 52. The remainder of the system is then essentially that shown in FIG. 1B, namely, one or more terminals 70 connected to the path 68 via an adapter 72 having an interconnecting means 18 therein, and a mass storage device 74 interconnected to the path 68 via an adapter 76 having an interconnecting means 18. In this configuration, not only can each processor communicate with each device in the system, but the processors can communicate directly with each other. Further, cache memory 190 is effectively accommodated. Despite the differing nature and level of complexity imposed by this demanding mixture of devices in the same system, the interconnecting means described herein efficiently controls all the communications in essentially the same way.

Figure 2:
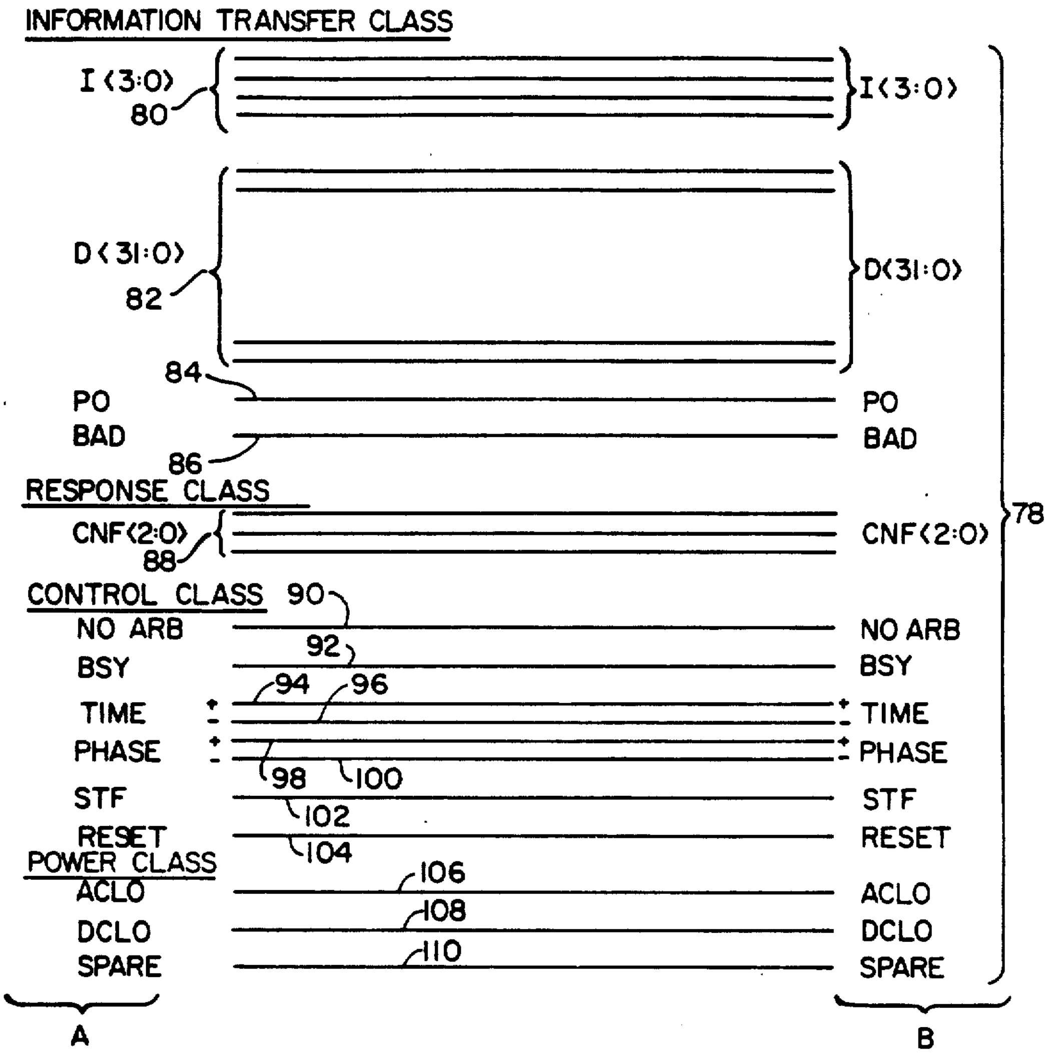
FIG. 2 illustrates the signal structure of the interconnecting means.

Turning now to FIG. 2, the various categories of signals generated and utilized by interconnecting means are summarized in accordance with their principal functional class. Within each class, they are grouped by their separate subfunctions. Additionally, the specific wires of the group of wires (or communications path) 78 which carry these signals from one device to another are also shown in order to faciliate subsequent discussion. A line is considered to be asserted if any device attached to the line asserts it. The line is deasserted only if no device is asserting it. For purposes of illustration, two separate interconnecting means, designated A and B, respectively, and integral with the corresponding physical devices whose communications they control, are illustrated schematically by the signals utilized by them, and are shown as interconnected for signal exchange purposes by path 78. However, it should be understood that path 78 will typically physically link more than two devices at any one time, although only those devices selected by the Current Master will actually participate in a transaction. The remaining devices remain physically connected to the communications path but do not participate in the transaction.

As illustrated in FIG. 2, there are four broad classes of signals utilized by the interconnecting means, namely, Information Transfer class signals; Response class signals; Control class signals; and Power class signals. The "Information Transfer" class signals include an Information field, designated I[3:0], which is transmitted and received over four separate lines 80 of the path 78. The Information field carries information such as the command code, code identifying the device initiating the transaction (the "Current Master"), and information specifying the status of data transmitted during the cycle, among other information. A thirty two bit data word transmitted over lines 82, labeled D[31:0] in FIG. 2, provides certain information needed in the transaction, such as the length of a data transfer that is to take place (used in Read-type and Write-type transactions); the identity of a device which is selected to participate in the transaction; the address of memory locations which are to be accessed for data transfer; and the data which is to be transferred. This word is transmitted and received over thirty two separate lines 82. Two lines, 84 and 86, designated "PO," used for indicating the parity on the information and data lines, and BAD, signalling an error condition, are also provided.

The "Response" class of signals comprises a three-bit field, designated CNF[2:0] and transmitted over lines 88, which provides a response to various information transmitted to a device and which allows the devices to alter the progress of the transactions, as described in more detail subsequently.

The "Control" class signals are transmitted over a group of eight lines 90-104. The first of these signals, NO ARB, controls the arbitration process. The second of these, BSY, indicates current control of the communications path by a device. These two signals are used in conjunction with each other to provide an orderly transition of control among devices seeking control of the communications path.

Of the remaining signals in the control class, the Time (+) and Time (−) signals comprise waveforms generated by a single source connected to the path 98 and transmitted over lines 94, 96, respectively; they are used in conjunction with the Phase (+) and Phase (−) waveforms, also generated by a single source, and transmitted over lines 98 and 100, respectively, to establish the local timing reference for operation of the interconnecting means at each device. Specifically, the interconnecting means of each device connected to the path 78 generates local transmitting and receiving clock signals, TCLK and RCLK, respectively, from the Time and Phase signals. Finally, the STF signal, transmitted over line 102, is used to enable a "Fast Self Test" of the local devices, as described in more detail hereinafter, while the RESET signal, transmitted over line 104, provides a means of initializing (setting to a known status) the devices attached to the communications path.

In the "Power" signal class, the AC LO and DC LO signals are transmitted over lines 104, 106, respectively and are monitored by each device to determine the status of the AC and DC power within the system. A Spare line 110 provides for future expansion.

Figure 3A:
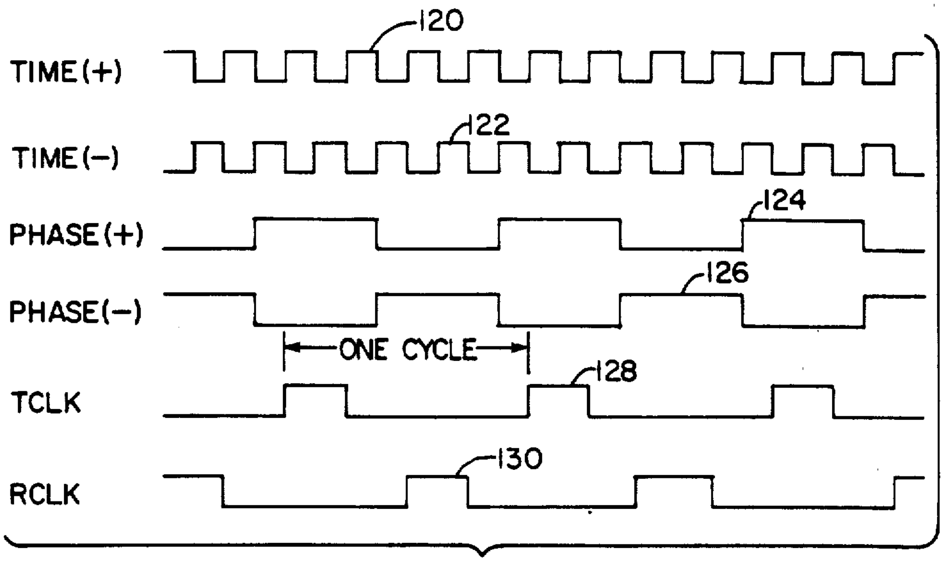
FIG. 3A is a timing diagram illustrating the signals that define transaction cycles for the interconnecting means.

The interconnecting means described herein performs its function of establishing communication among selected devices by performing a sequence of operations that are specific to the type of communication to be undertaken. Each operation comprises a sequence of cycles during which various elements of information are placed on, or received from, the communications path in order to effectuate the desired communication with another device or devices also connected to this path. These cycles are defined by the Time and Phase clocks as may be understood more clearly on reference to FIG. 3A which shows Time (+) and Time (−) clock signals 120 and 122, respectively, as well as Phase (+) and Phase (−) signals 124 and 126, respectively. These signals are generated by a single Master clock connected to the communications path. They are received by the interconnecting means of each device and used to generate the local TCLK and RCLK signals 128 and 130, respectively, which control the transmission and reception of information by them.

Figure 3B:
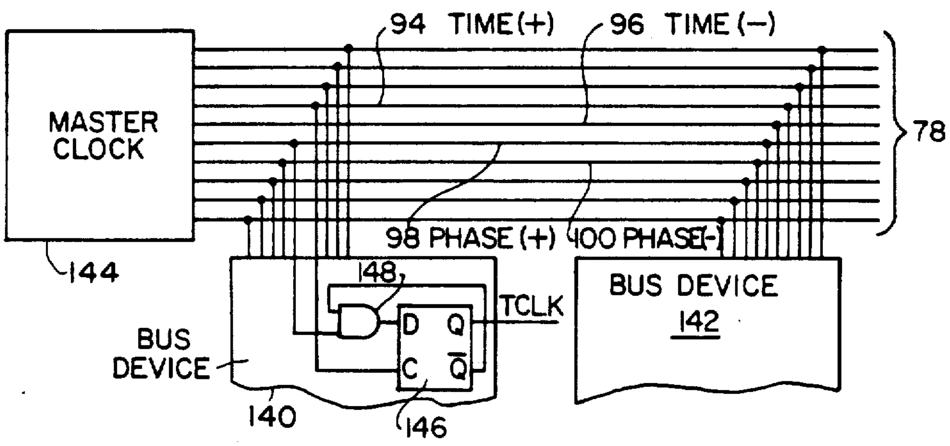
FIG. 3B is a block diagram depicting a master clock and certain elements of the interconnecting means controlled by the timing signal.

Thus, as shown in FIG. 3B, a number of devices 140, 142, etc. are connected in parallel to the communications path so as to transmit and receive information over these lines. These devices may be input/output (I/O) devices such as printers, display terminals, etc. or may be devices such as processors. The physical placement of the devices on the path is immaterial. A Master Clock 144 also connected to the path generates the Time and Phase signals which are transmitted to each device over lines 94-100. Each interconnecting means includes timing circuitry for generating local transmitting and receiving clocks TCLK and RCLK, respectively. For example, device 140 may include a flip-flop 146 whose Q output produces TCLK. The flip-flop is set from a gate 148 and is clocked by the Time (+) signal from line 94. Gate 148 in turn is enabled by line 98 and the Q bar output. In similar fashion, the local Slave receive clock, RCLK, is generated from the received Time (+) and Phase (−) signals.

Figure 3C:
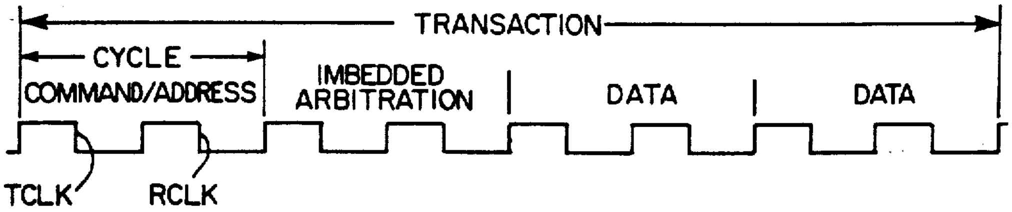
FIG. 3C is a timing diagram depicting the timing for a transaction performed by an interconnecting means.

As shown in FIG. 3C, the time between successive TCLK signals defines a cycle. A sequence of successive cycles which is utilized to perform a desired interchange of information is herein called a "transaction." Although the detailed characteristics of each transaction vary in accordance with the operation performed by it, each transaction consists, generally, of a Command/Address cycle; an Imbedded Arbitration cycle; and one or more additional cycles, most commonly designated as "Data" cycles. For purposes of illustration only, two such data cycles are shown in FIG. 3C. In general, information is placed on the communications path 78 at the leading edge of TCLK and is latched into the interconnecting means of a device during RCLK of the same cycle.

Figure 3D:
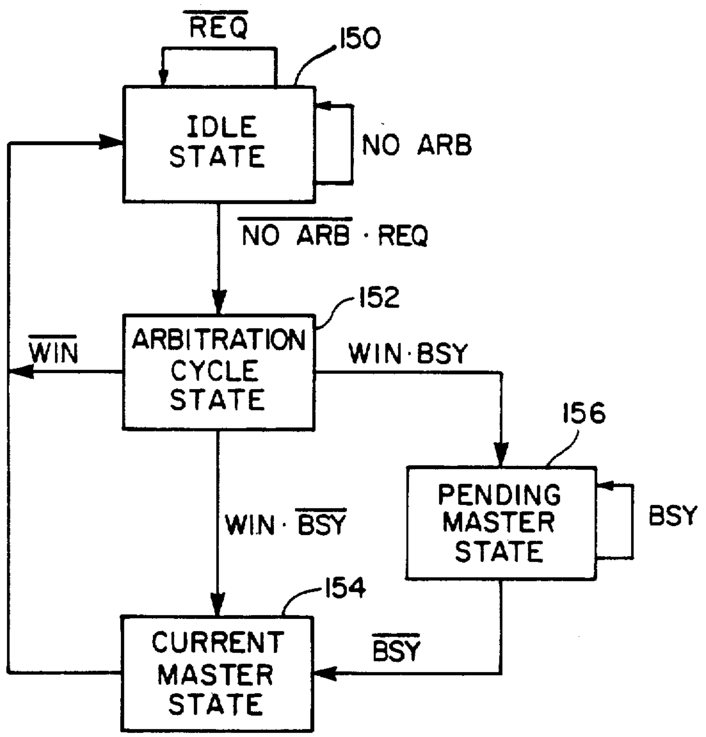
FIG. 3D illustrates the arbitration function sequence.

A state diagram of the arbitration function performed by each interconnecting means is shown in FIG. 3D. The arbitration function remains in the idle state 150 until some element in the device causes it to seek to initiate a transaction as indicated by REQ in FIG. 3D. When this occurs, the interconnecting means determines whether it is free to assert its arbitration signals on the path 78 by examining the NO ARB line. As long as NO ARB is asserted, the arbitration function must remain in the idle state. However, as soon as NO ARB is deasserted, the device may arbitrate during the following cycle, provided that REQ is still asserted. Under these conditions, it enters the arbitration state 152 in which the device arbitrates with other devices seeking access to the communications path. The manner of arbitration will be described in more detail hereinafter.

A device losing the arbitration returns to the idle state 150, from which it may again seek to arbitrate as long as REQ is asserted. Conversely, a device winning the arbitration enters either the Current Master state (if BSY is deasserted) or the Pending Master state (if BSY is asserted.) A Pending Master remains Pending Master as long as BSY is asserted, and becomes Current Master following the deassertion of BSY.

Before describing the operation sequence of each of the transactions provided for by the interconnect, it will be helpful to obtain a more detailed understanding of some of the Control, Response, and Information Transfer class signals themselves, as these are common to essentially all the transaction types.

Control Signals: NO ARB, BSY

The NO ARB signal controls access to the data lines for purposes of arbitration. Devices may arbitrate for use of the communications path only in those cycles for which NO ARB has been deasserted for the previous cycle. The device which has control of the interconnect (the "Current Master") asserts NO ARB throughout the transaction except during the first cycle and the last expected data cycle. (The last expected data cycle of a transaction is usually the last data cycle in fact; however, as described more fully hereafter, devices may delay completion of a transaction under certain conditions. When they do, the cycle that is expected to be the last data cycle no longer is, and subsequent cycles follow before all the data is transferred.) NO ARB is also asserted by the Pending Master until it becomes the Current Master. At any one time, there is at most only one Current Master and one Pending Master.

NO ARB is also asserted during an arbitration cycle by all arbitrating devices. During an Imbedded Arbitration cycle, this assertion is in addition to the assertion of NO ARB by the Current Master. During an Idle Arbitration cycle, assertion of NO ARB by an arbitrating device will preclude subsequent arbitrations until one of the devices currently arbitrating becomes Current Master.

NO ARB is additionally asserted by Slave devices (devices selected by the Current Master) for all cycles in which the Slave asserts STALL, as well as for all data cycles except the last. It is also asserted by a device (coincidentally with assertion of BSY) during special modes when the interconnecting means is occupied servicing its own device. In these modes, the device does not use any communications path lines other than BSY and NO ARB. Due to the potential of being selected as Slave, a device is prevented from entering a special mode during a command/address cycle. A device may operate in a special mode, for example, in order to access registers in the interconnecting means without requiring use of Information Transfer class lines of the communications path. Further, it may also be desirable to allow the Current Master to continue assertion of NO ARB beyond its usual termination cycle to thereby perform a sequence of transactions without relinquishing control of the communications path. This would be particularly useful for high speed devices to allow extended information transfer cycles, and thus effectively increase the available bandwidth for that device.

BSY indicates that a transaction is in progress. It is asserted by the Current Master during the entire transaction, except during the last expected cycle. It is also asserted by Slave devices which need to delay progress of the transaction (e.g., a memory device which needs additional time to access a particular memory location); the delay is accomplished by asserting BSY and NO ARB together with a STALL response code (to be described later). In addition, BSY is also asserted for all data cycles except the last. A device may also extend the assertion of BSY in order to delay the start of the next transaction, or when operating in the special modes discussed above.

BSY is examined by devices at the end of each cycle; when deasserted, a Pending Master may assert it and assume control as Current Master.

Figure 3E:
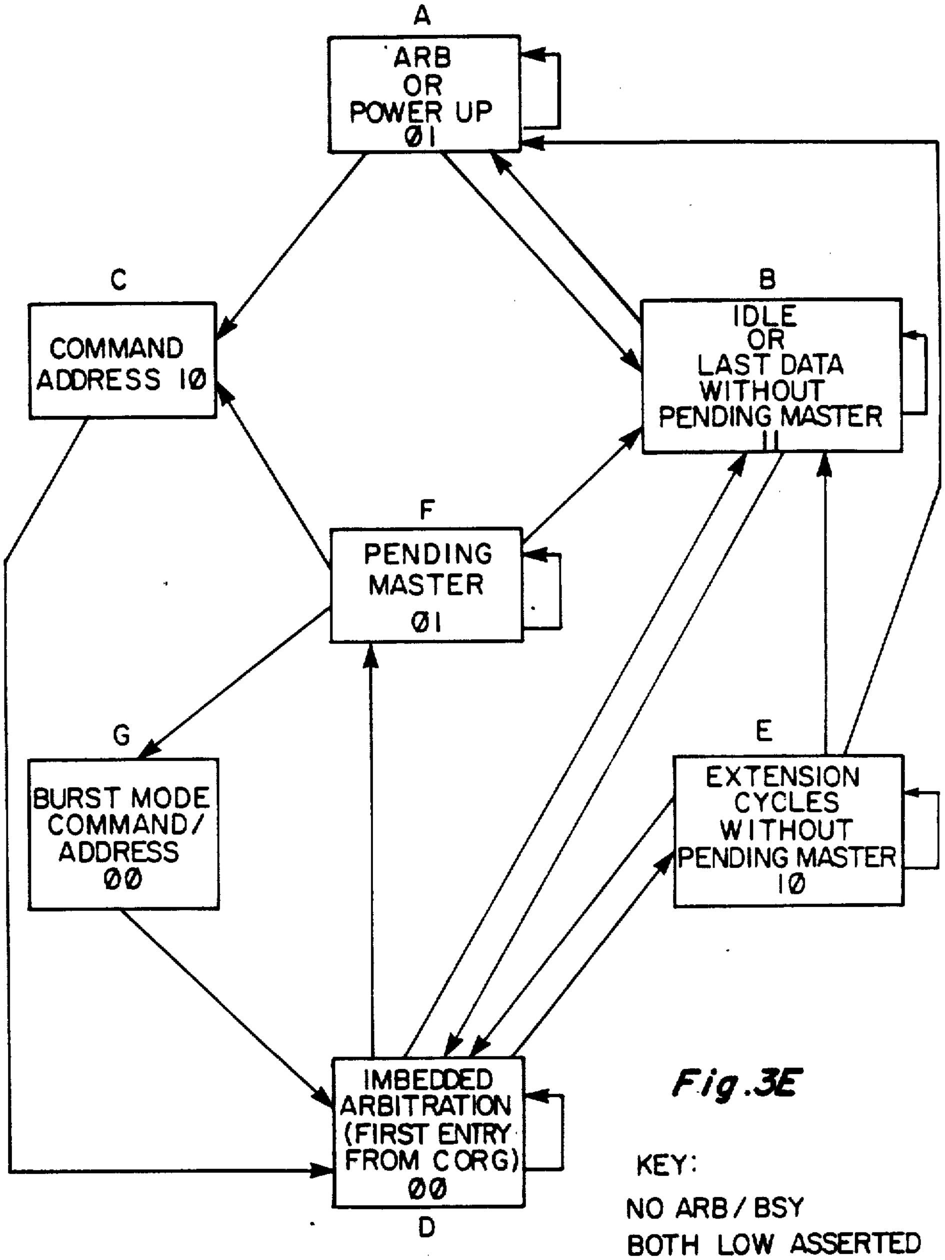
FIG. 3E illustrates BSY and NO ARB sequences.

FIG. 3E is a state diagram of possible sequences of the BSY and NO ARB control lines in the present implementation. It will be used to illustrate the manner in which the joint observation of these signals efficiently controls the exchange of information from device to device on the communications path.

On the power up all devices assert NO ARB (State "A") effectively preventing access by any device until all devices deassert the line (State "B"), at which time the communications path enters the IDLE state. This allows time for all devices to complete any power up initialization sequence if required. Once NO ARB is deasserted and State "B" is thereby entered, devices may freely seek to contend for control of the communications path. Once a device arbitrates, State "A" is again entered whereupon the "winning" device enters Command/Address State "C". It is important to note that this Command/Address cycle is recognized by all devices not only by the transition of BSY from the deasserted to the asserted state but in conjunction with the assertion of NO ARB in the previous cycle. The observation of NO ARB is necessitated for devices to ignore the special mode state as a Command/Address.

The first entry of State "D" from the Command/Address state is indicative of the Imbedded Arbitration cycle of a transaction. It is this cycle that devices update their dynamic priority (if in "dual round robin" mode) by observation of the encoded Master ID. Depending on the data length of the transaction, control may remain in this state for subsequent cycles. If no arbitration occurs, the Master and Slave eventually relinquish control of the communications path and flow proceeds again back to State "B", the deassertion of both control signals. If, however, a Pending Master exists, state F will be subsequently entered, whereupon the device asserting NO ARB will notice the deassertion of BSY in this cycle and proceed either to Command/Address "C" or "G" depending on whether the decision to preclude further arbitration by other devices (referred to as "BURST MODE" in the diagram) is determined by the Master. Note that in State "G" the Command/Address control signals show that NO ARB and BSY are both asserted which differentiates this from Command/Address State "C".

If the previous transaction was extended by the assertion of BSY, and no Pending Master had existed, control would have sequenced from State "D" to "E", and remain in State "E" for one or more cycles as required. The witnessed assertion of BSY would cause control to remain in this state for one or more cycles, whereupon the sequence may continue back to IDLE State "B" and relinquish the communications path for future transfers.

As described above, a special mode of operation may have alternatively caused control to return to State "D" for one or more cycles if one particular device wished preclusion of selection as a Slave by any other device. The simultaneous deassertion of BSY and NO ARB would then again return control to State "B", the IDLE condition.

The figure therefore shows that the joint operation of NO ARB and BSY regulates the orderly flow of control exchange as well as information transfer on the communications path.

Response Signals: ACK, NO ACK, STALL, RETRY

System reliability is greatly increased by requiring a response to transmissions over the Information and Data lines. Generally, response is expected exactly two cycles after the particular transmission. The response code for these devices is shown in FIG. 6, where a "0" bit indicates assertion (low level) and a "1" bit indicates deassertion (high level).

The ACK response indicates successful completion of a transmission reception by the intended recipient of the transmission. For all transaction types, the assertion of ACK during the first data cycle of the transaction confirms correct receipt (i.e., no parity error) of the Command/Address information transmitted two cycles earlier. Additionally, in the first data cycle as well as in subsequent data cycles in Read-type and Ident transactions, ACK also indicates that read or vector data is being asserted by the Slave, while in Write-type transactions ACK also indicates that the Slave is prepared to accept Write data.

NO ACK indicates either a failure in the transmission/reception or that no Slave has been selected. Both ACK and NO ACK are permissible responses to command transmissions, as well as to data transmissions; in the latter case, the responses occur through the two cycles following the last data cycle, even though these cycles may coincide with a subsequent transaction. NO ACK is the default state of the response lines. It is defined in such a way that any other code may override it.

STALL may be asserted by a Slave device during data cycles. For example, it is used by memories to extend the time allowed for a read access or to provide time for a refresh or error correction cycle during a transaction. It is also used by memories to delay further data transmission from the Master when the memory write buffer is full. It is used by devices to synchronize to another communication path. One or more STALLS may be used to delay an ACK or NO ACK command confirmation if the device recognizes that it is the Slave.

RETRY is asserted by a Slave device which cannot immediately respond to a transaction. For example, it is used by devices requiring a long internal initialization sequence; by devices waiting for access to another communications path; and by memories which have been locked by an Interlock Read command as described below. The Current Master responds to the Slave RETRY response by terminating the transaction. In the present implementation, RETRY is not used after the first data cycle of a transaction. This simplifies the interconnection logic. One or more STALLS may precede the assertion of RETRY.

In order to prevent a device from monopolizing the communications path, a limit is placed on the extensions or successive assertions of STALL, RETRY, BSY and NO ARB.

System Architecture: Specific Transaction Sequences

FIGS. 4A-H set forth in detail the specific characteristics of the transactions provided for by the interconnecting means. In particular, transactions for reading and writing data (READ, READ WITH CACHE INTENT, INTERLOCK READ WITH CACHE INTENT, WRITE, WRITE WITH CACHE INTENT, WRITE MASK WITH CACHE INTENT, and UNLOCK WRITE MASK WITH CACHE INTENT); for invalidating obsolete cached data (INVALIDATE); for handling interrupts (INTERRUPT, INTERPROCESSOR INTERRUPT, IDENTIFY); for halting transaction generation by devices (STOP); and for transmitting information to a number of devices simultaneously (BROADCAST) are illustrated in detail. In each of the Figures, the range of permissible CNF responses is set forth, and the particular response illustrated is marked by a dot (.). Further, for purposes of illustration only, the transactions are shown as including only two cycles of data transfer although a larger or smaller number of cycles may be used.

The commands described herein are of two general types, namely, single responder commands (Read-type, Write-type commands, and IDENTIFY) and multi-responder commands (STOP, INVALIDATE, INTERRUPT, INTERPROCESSOR INTERRUPT, and BROADCAST). In order to insure the unique recognition of responses when multiple responses are being asserted on the same lines, the permissible responses to multi-responder commands are limited to ACK and NO ACK.

Read-Type Transactions

Referring now to FIG. 4A, the characteristics of a Read-type transaction are set forth in detail. This type of transaction includes not only the READ command, but also the READ WITH CACHE INTENT and the INTERLOCK READ WITH CACHE INTENT commands as well. The four-bit codes for these commands are shown in FIG. 5A, together with the codes for the other commands utilized by the device interconnecting means. Note that additional codes may subsequently be added, as indicated by the dash (−) in this Figure. The transaction comprises a number of successive cycles, namely, a command/address cycle 180, an Imbedded Arbitration cycle 182, and a number of data cycles. For purposes of illustration only, the transaction is shown as including two data cycles 184, 186, respectively. The principal lines on which information is transmitted (cf. FIG. 2) are indicated by their functional names, namely, the Information lines I[3:0], the Data lines D[31:0], the Confirmation lines CNF[3:0], and the NO ARB, BSY and P (parity) lines. For clarity of illustration, the remaining lines (i.e., Time, Phase, STF, RESET, AC LO, DC LO, BAD and SPARE) are omitted in FIG. 4 since they are not essential to understanding the operation of the transactions.

As indicated in FIG. 4A, during the command/address cycle of a Read-type transaction, the four-bit command code is placed on the information lines I[3:0]. Additional data required in connection with the command is placed on the data lines D[31:0]. Specifically, a two-bit data length code specifying the length of the transfer which is to take place is applied by the interconnecting means to data lines D[31:30], while the "address" of the device with which the transfer is to take place is applied to data lines D[29:0]. The fact that these signals are asserted on the appropriate lines by the device which currently has control of the interconnect (the "Current Master") is indicated by the letter "M" in the appropriate block in FIG. 4A. The assertion of information on a given line or set of lines by a Slave device is indicated by the letter "S" in FIG. 4A. In similar fashion, the letters "AD", "AAD", "APS" and "PM" (i.e. "All Devices", "All Arbitrating Devices", "All Potential Slaves", and "Pending Master", respectively) indicate various other devices which may assert signals on selected lines of the communications path during particular cycles.

The address comprises a single thirty-bit word designating the specific storage location with which a Read-type or Write-type transaction is to take place. A separate block of addresses is assigned to each device. The location of the block is based on the identification number of the associated device.

During the Command/Address cycle, the Current Master deasserts NO ARB as shown at 158 in FIG. 4A. (For purposes of discussion herein, a signal is considered "asserted" when at a low level, and "deasserted" when at a high level). Deassertion of NO ARB allows other devices desiring control of the communications path to arbitrate for such access during the following cycle. At the same time, the device asserts BSY to prevent other devices from gaining control of the communications path while the current transaction is in process. No signals are applied to the CNF lines at this time by the Current Master, although it should be understood that, in the course of a sequence of transactions, one or more Response signals may be applied to the CNF lines by other devices during a transaction by a Current Master.

The second cycle of the transaction comprises an arbitration cycle. It is referred to as an "imbedded" arbitration cycle since it is contained within a transaction. Arbitration which occurs outside of a transaction is referred to as an "Idle" arbitration cycle. During the Imbedded Arbitration cycle of FIG. 4A, the Current Master places its identification number (ID) on the information lines I[3:0]. This code is used by all devices to update their arbitration priority, as previously described.

At this time also, those devices seeking use of the communications path assert a single-bit signal corresponding to their identification number on either the low priority level lines, D[31:16], or the high priority level lines D[15:0], e.g., device 11 asserts line D[11] if arbitrating at high priority and asserts line D[27] if arbitrating at low priority.

The level at which the device arbitrates is determined by its arbitration mode as well as by the ID of the previous Master. In the present implementation, the arbitration mode is defined by bits 4 and 5 of the particular device's control and status register, i.e., CSR[5:4] (see FIG. 7C). As presently implemented, four modes are provided for, namely, fixed high priority, fixed low priority, "dual round robin", and arbitration disabled. The interconnecting means supports mixing these modes at will by appropriately setting the arbitration mode bits CSR[5:4].

In the case of arbitration in a fixed-priority mode, whether fixed high or fixed low, the priority does not vary from transaction to transaction. In contrast, in the case of "dual round robin" arbitration the priority of a device may change from one transaction to another as described previously. In particular, in the "dual round robin arbitration" mode, during a given transaction, a device will arbitrate at a low priority level (i.e., on lines D[31:16]) if its ID number is equal to or less than the ID number of the Master in the immediately preceding transaction, and will arbitrate at a high priority level (i.e., lines D[15:0]) otherwise.

Continuing on with the transaction of FIG. 4A, at the conclusion of the Imbedded Arbitration cycle, a device which has arbitrated during this cycle and won the arbitration becomes Pending Master, and asserts NO ARB until it becomes Current Master, as shown in dotted lines in FIG. 4A. This prevents other devices from subsequently arbitrating for, and possibly gaining control of, the communications path before the Pending Master can assume such control.

The arbitration cycle is followed by one or more data cycles. For purposes of illustration, FIG. 4A shows two such data cycles only. As noted previously, the actual amount of data to be transferred in each transaction, and thus the number of data cycles utilized by the transaction, is specified in the command/address cycle by bits D[31:30]. In the particular implementation described in FIG. 4A, from one to four cycles of data (here, 32 bits per cycle) may be transmitted in a transaction. Of course, by providing fewer or more bits for the data length specification, a lesser or greater number of data cycles, and thus transaction cycles, may be provided for.

In the case of a Read-type transaction as shown in FIG. 4A, the data called for by the transaction is supplied by the Slave to which the transaction is addressed. This device may be a memory device or it may be some other device such as an input/output terminal. In either event, the device so selected asserts its data on the data lines D[31:0] during the data cycle. At this time, also, it asserts a code on lines I[3:0] which indicates the status of the data. For example, for memory references, the code may indicate whether the data is data that has been retrieved without utilization of any correction algorithms (referred to simply as "read data"), data that has been corrected before being asserted on the data lines (referred to as "corrected read data"); or data that, for one reason or another, cannot be relied on ("read data substitute"). Further, the status code indicates whether or not, for each of these data categories, the data may be cached. The use of the "don't cache" facility will greatly enhance performance in some systems. These codes are illustrated in FIG. 5B.

During the first data cycle, the Slave returns to the Master a confirmation code on lines CNF[2:0] which confirms receipt of the Command/Address information from the Master and which may provide further information to the Master with respect to the Slave's response. Thus, the first assertion of the confirmation signals, for the current transaction, is made during the first data cycle, two cycles after the Command/Address cycle which began the transaction. For the Read transaction described in FIG. 4A, the permissible responses in the first data cycle are the ACK ("Acknowledge"), NO ACK ("Not Acknowledge"), STALL and RETRY. These are largely common to all transactions, with certain exceptions which will be described in connection with the particular transactions.

In general, the assertion of ACK during the first data cycle indicates correct receipt of Command/Address information, together with the ability of the Slave to take the requested action, i.e., return read data. Conversely, the assertion of NO ACK indicates either an error in transmission of the command or some other inability of a Slave to respond. The assertion of STALL allows the Slave to extend the transaction in order to prepare itself to provide the read data requested by the Master, while the assertion of RETRY indicates current inability to respond to the command, accompanied by a request that the Master try again at a subsequent time. RETRY is appropriately used when the expected response time of the Slave would be so long that it would be undesirable to extend the transaction an excessive number of cycles by asserting general STALL responses.

In FIG. 4A, the ACK response (designated by a dot (.) before the response) is illustrated. If the response were NO ACK, the action taken by the Master would differ from that taken in response to ACK, e.g., the Master may seek to repeat the transaction a limited number of times, may call for an interrupt, etc. A STALL response is similar to an ACK response but the transaction will be extended by one or more "blank" cycles (cycles in which no valid data is present on the data lines) before the requested data is returned.

The second, and last, data cycle in FIG. 4A is similar to the preceeding data cycle, that is, the Slave asserts the requested data on lines D[31:0] together with a code indicating the status of the data on lines I[3:0]. At the same time, it asserts a confirmation signal on CNF[2:0]. Unlike the Slave's response to the first data cycle, however, the Slave may respond only with ACK, NO ACK, or STALL; it may not assert RETRY. Further, since the second data cycle is the last data cycle of the transaction in FIG. 4A, the Slave deasserts both NO ARB and BSY. If the Slave were to extend the transaction by asserting STALL so that the return of read data would be deferred a subsequent cycle, the Slave would continue its assertion of NO ARB and BSY until the last data cycle in fact occurred. It would then deassert NO ARB and BSY during that last data cycle. As noted previously, deassertion of BSY allows a Pending Master to assume control of the communications path on the following cycle, while the Slave's deassertion of NO ARB is preparatory to allowing subsequent arbitration to occur for access to the communications path.

With the completion of the second and last data cycle, the principal information transfer functions of the transaction of FIG. 4A are completed. However, it is still necessary to confirm the correct receipt of the data. This is accomplished during the two cycles following the last data cycle during which the Master asserts the appropriate confirmation signal on CNF[2:0] with respect to receipt of the data. As shown, the appropriate confirmation is either ACK or NO ACK. Note that the confirmation extends beyond the last data cycle and may thus overlap with the Command/Address and Imbedded Arbitration cycles of a following transaction. However, no error will arise from this since the confirmation lines are not used by the following transaction during its first two cycles.

During the Command/Address cycle parity is generated by the Current Master on the I[3:0] and D[31:0] lines, and is checked by all devices. During the Imbedded Arbitration cycle, it is generated by the Master on the I[3:0] lines only and checked by all devices. During the data cycles, parity is generated by the Slave on the I[3:0] and D[31:0] lines and is checked by the Current Master. The specific consequences of a parity error will depend on the nature of the information being transmitted during the given cycle when the error occurs. At a minimum, devices detecting a parity error during the Command/Address cycles should not respond to selection; additionally, they may indicate the parity error by setting an error flag, initiating an interrupt, or other such action.

As noted previously, the Read With Cache Intent command has the same format as the Read transaction. It is generated by devices with cache to indicate to the Slave that the requested read data may be placed in the Master's cache. When this command is used in conjunction with the INVALIDATE command described below, it can provide a significant performance enhancement in certain systems with cached devices.

The Interlock Read transaction also has the same format as the Read transaction. It is used with shared data structures to provide exclusive access to data by processors and other intelligent devices. Slaves supporting the Interlock Read command have one or more interlock bits corresponding to designated storage locations. When accessed by an Interlock Read Command, a Slave sets the appropriate bit corresponding to the addressed location. This prevents subsequent Interlock Read accesses to the location until the bit is reset to thereby unlock the given location. This bit is typically reset by the UNLOCK WRITE MASK WITH CACHE INTENT Command described below. The INTERLOCK READ command is especially useful in systems having processors which provide read-modify-write operations to insure that intervening devices using the Interlock Read Command are precluded from access to data after the initiation, but before the completion, of such an operation. Slaves addressed by INTERLOCK READS while the interlock is set issue a RETRY. Note that the interlock bit is set only if the Interlock Read transaction is successful, i.e., the Master confirms correct receipt of the Slave's read data.

Write-Type Transaction

Turning now to FIG. 4B, the Write-type transactions (as implemented, WRITE, WRITE WITH CACHE INTENT, WRITE MASK WITH CACHE INTENT, and UNLOCK WRITE MASK WITH CACHE INTENT) are shown in detail. Starting with the Command/Address cycle, the current Master places the appropriate four bit code for the command on information lines I[3:0]; a two-bit code identifying the length of the data transmission on data lines D[31:30]; and an address on data lines D[29:0]. At the same time, it asserts BSY to indicate the occupied status of the communications path, and deasserts NO ARB to signal the availability of the data lines for arbitration during the immediately following cycle.

During the second cycle, the Current Master places its ID on information lines I[3:0]. Devices seeking control of the communications path for a subsequent transaction assert a single bit corresponding to their ID on the data lines at this time. As was previously the case, the assertion is made of one of the low priority data lines D[31:16] for arbitration at the low priority level, and is made on the high priority data lines D[15:0] for arbitration at the high priority level. The Master continues to assert BSY at this time, and the Master, as well as devices participating in the arbitration, assert NO ARB at this time also.

In the example shown in FIG. 4B, the third and fifth cycles are data cycles. Although two data cycles are shown, a lesser or greater number may be utilized, in accordance with the transfer length specified on lines D[31:30] in the Command/Address cycle. The data being written by the Master is applied to data lines D[29:0] during these cycles. The Information lines I[3:0] carry either a write mask (in the case of a Write Mask transaction) during the data cycles to indicate the selected byte or bytes which are to be written during the transaction, or are "undefined" (in the case of Write and Write With Cache Intent transactions). The "undefined" status of the I[3:0] lines indicates that any information on these lines is to be ignored by the devices for purposes of the transaction.

During the first data cycle, the Current Master continues to assert BSY and NO ARB. During the fourth data cycle, which the Current Master expects to be the last data cycle, the Current Master deasserts both BSY and NO ARB to prepare for an orderly transition of communications path control.

In order to illustrate the capability of a Slave to extend a transaction, the fourth cycle (Data 2) is shown as stalled by way of the Slave's assertion of STALL. For example, this may be done when the Slave is unable to accept the second data word at this time. The Slave asserts BSY and NO ARB during this cycle. The last data cycle of this transaction is cycle 5. During this cycle the Master responds to the assertion of STALL by retransmitting Data 2. The Slave asserts ACK on the CNF lines; and the Slave deasserts both BSY and NO ARB. In the two cycles following the last data cycle, the Slave continues to assert ACK to confirm the correct receipt of Write data.

When a Write-type transaction occurs on the communications path, devices connected to the path and having resident cache memory invalidate any cached data within the address range of the write command. As was the case with the READ WITH CACHE INTENT command, the WRITE WITH CACHE INTENT command, when used with the Invalidate command offers significant performance advantages in certain systems.

The write mask is a four-bit code indicating, by the presence of asserted bits in one or more of the four-bit positions, the selection of the corresponding eight-bit bytes to be written. Thus, the code 1001 indicates that only the first and fourth bytes (corresponding to D[7:0] and D[31:24], respectively) of a four byte (32 bit) word are to be written.

The UNLOCK WRITE MASK WITH CACHE INTENT command is used in conjunction with the Interlock Read command to implement indivisible operations such as a read-modify-write operation.

As may be seen from FIG. 4B, during a WRITE-type transaction, parity is generated by the Master during all cycles of the transaction. It is checked by all devices during the Command/Address and Imbedded Arbitration cycle; and by the Slave during the data cycles.

Invalidate Transaction

The Invalidate transaction is used by systems having cache memories associated therewith. It is issued by devices under certain conditions to guarantee that obsolete data that may be present in the caches of other devices is not used. In the Command/Address cycle of this transaction, as shown in FIG. 4C, the Current Master asserts the Invalidate command on information lines I[3:0] and the starting address of the data to be invalidated on data lines D[29:0]. The number of consecutive locations of cached memory to be invalidated is indicated by the data length code on lines D[31:30]. The Command/Address cycle is followed by the usual Imbedded Arbitration cycle, and a data cycle during which no information is transmitted. As with other multi-responder commands, the specified permissible responses are ACK and NO ACK.

Interrupt and Identify Transactions

An Interrupt transaction is illustrated in FIG. 4D. The purpose of the transaction is to notify other devices (typically, processors) of the need to interrupt current activities in order to take other action. The interrupted device responds with an IDENT command to solicit the Interrupt Vector. This vector serves as a pointer to the address of an interrupt routine stored in memory which will establish the required action.

The Interrupt transaction comprises a Command/Address cycle, an Imbedded Arbitration cycle, and a data cycle in which no information is transmitted. During the Command/ Address cycle, the Interrupt command code is asserted on the Information lines I[3:0] by the device seeking to interrupt. During this cycle, the interrupting device also asserts one or more interrupt priority levels on data lines D[19:16] to identify the immediacy of requested services. The interrupting device also places an interrupt destination mask on data lines D[15:0]. This mask specifies the devices to which the interrupt is directed. All devices on the communications path receive this mask. If any asserted bit in the mask corresponds to the device's decoded ID, then the device is selected. This device will later respond with an Identify transaction.

Devices which have been selected by the interrupt respond by transmitting an ACK signal two cycles after the Command/Address cycle. As with all other multi-responder commands, ACK and NO ACK are the only permissible responses.

Devices selected during an interrupt may be expected to engage in a subsequent transaction with the interrupt-requesting device in order to complete the interrupt process. Accordingly, each responding device maintains a record for each interrupt level to indicate whether an interrupt was received at the corresponding level. Typically, the "record" comprises a flag bit in a flip flop (hereinafter referred to as an Interrupt Pending Flip-Flop). Each bit remains set until the corresponding interrupt has been serviced.

The second and third cycles comprise the usual Imbedded Arbitration cycle as previously described, as well as a data cycle in which no further information is transmitted. Confirmation is made by one of the confirmation codes permissible for multi-responder commands, ACK or NO ACK.

FIG. 4E illustrates an Identify transaction. This transaction takes place in response to an Interrupt transaction. During the Command/Address cycle, the Current Master asserts the Identify command code on Information lines I[3:0] and asserts on data lines D[19:16] a code corresponding to one or more interrupt levels to be serviced. It also asserts BSY and deasserts NO ARB. The following cycle is the usual Imbedded Arbitration cycle.

In the next cycle, the Current Master reasserts its ID number, this time in decoded form on data lines D[31:16]. Each device that requires service at an interrupt level specified in the Command/Address cycle compares the decoded Master ID with the interrupt destination mask that it had earlier transmitted in order to determine whether it is one of the devices to which the Identify command is directed. If it determines that it is, it manifests its status as a Potential Slave participating in the Interrupt Arbitration cycle. During both the Decoded Master and the Interrupt Arbitration cycles, the interrupting Slaves also assert BSY and NO ARB. During the Interrupt Arbitration cycle, the devices arbitrating to transmit their interrupt vector assert their decoded ID number on the appropriate one of the data lines D[31:16]. Arbitration takes place in the manner previously described, that is, the device having the highest priority (lowest ID number) "wins" the arbitration, thereby becoming the Slave. The Slave then asserts its interrupt vector on the data lines. This vector points to a location in memory which contains a further vector identifying the start of the interrupt service routine. At the same time, the Slave transmits a vector status code on information lines I[3:0] indicating the status of the vector in much the same manner as the data status indicated the status of the read data on these lines during a Read transaction.

As was the case with previously described transactions, the BSY signal is asserted by the Master during the transaction from the first cycle to the last expected cycle, while NO ARB is asserted from the Imbedded Arbitration cycle to the last expected cycle.

ACK, NO ACK, STALL and RETRY may be asserted by the Slave in response to the Identify command. This response occurs in cycle five, which is two cycles later than for all other transaction types. During the two cycles following the vector cycle, the Master asserts the ACK confirmation code to indicate successful completion of the transaction. On receipt of the Slave's acknowledgement of the Identify command, the Master resets the Interrupt Pending flip flop corresponding to the interrupt level for which the interrupt vector was transmitted. If the Slave does not receive the Master's acknowledgement to its transmission of the Interrupt Vector, it retransmits the Interrupt transaction.

A device may not participate in the interrupt arbitration cycle if it has detected a parity error in either the Command/Address or the Decoded Master ID cycles.

Devices which have arbitrated during the Interrupt Arbitration cycle but which have lost the arbitration are required to reissue the Interrupt Command. This prevents loss of previously posted interrupts.

Interprocessor Interrupt Transaction

A simplified form of interrupt is provided for multiprocessor systems when one processor seeks to interrupt one or more other processors. The Interprocessor Interrupt transaction, illustrated in FIG. 4F, comprises a Command/Address cycle, an Imbedded Arbitration cycle, and a data cycle in which no information is transmitted.

Figure 7A:
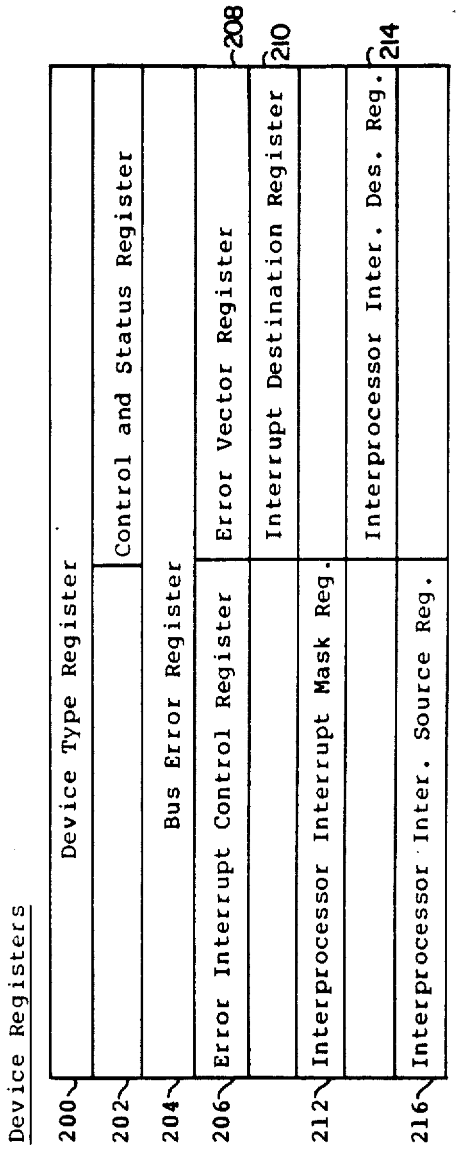
FIG. 7A is a diagram of the device-register set utilized by the interconnecting means.

In the particular implementation used to illustrate the intercommunicating means herein, this transaction makes use of three registers, namely, Interprocessor Interrupt Mask, Destination, and Source Registers 212, 214, and 216 respectively (FIG. 7A). The Mask Register contains a field that identifies the processors from which Interprocessor Interrupt commands will be accepted. The Destination register contains a field that identifies the processors to which an Interprocessor Interrupt Command is to be directed; the Source Register contains a field that identifies the source of Interprocessor Interrupt transaction received by a processor.

During the Command/Address cycle, the interrupting processor asserts the interprocessor interrupt command code on the information lines I[3:0]. At the same time, it asserts its decoded Master ID on the data lines D[31:16] and asserts a destination code (e.g., from its Interprocessor Interrupt Destination Register) on data lines D[15:0]. During the following Imbedded Arbitration cycle, the interrupting processor asserts its ID on the Information lines I[3:0], and arbitration proceeds in the usual manner.

During the third cycle, the devices addressed by the Destination Code asserted in the Command/Address cycle compare the decoded Master ID with the mask in the Mask Register to determine whether the Master is a device to which they may respond. If so, in addition, the Decoded Master ID is preferably stored in the Interprocessor Interrupt Source register in order to maintain the identity of interrupting devices. This saves the processor the overhead of later seeking an Interrupt Vector as is done in the Interrupt transaction. The permissible Slave confirmation signals are ACK and NO ACK as for any other multi-responder command.

Stop Transaction

Figure 7B:
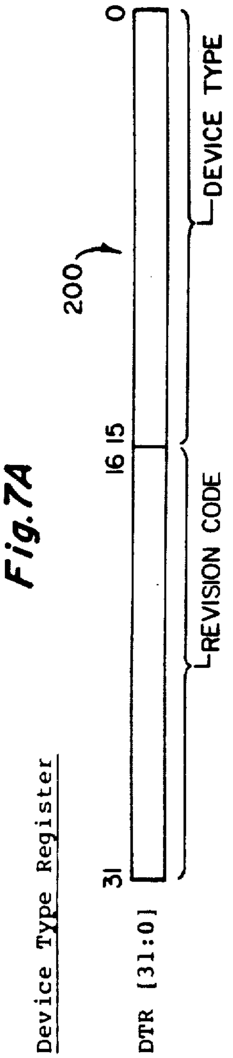
FIG. 7B is a more-detailed diagram of the device-type register, showing the specific utilization of various bits within that register.
Figure 7C:
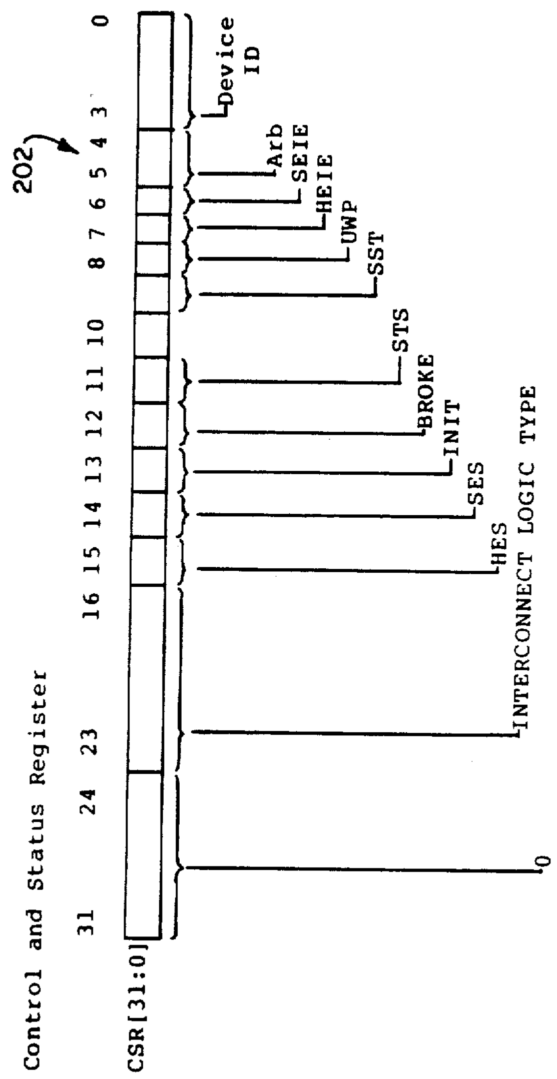
FIG. 7C is a more-detailed diagram of the control-and-status register, showing the specific utilization of various bits within that register.
Figure 7D:
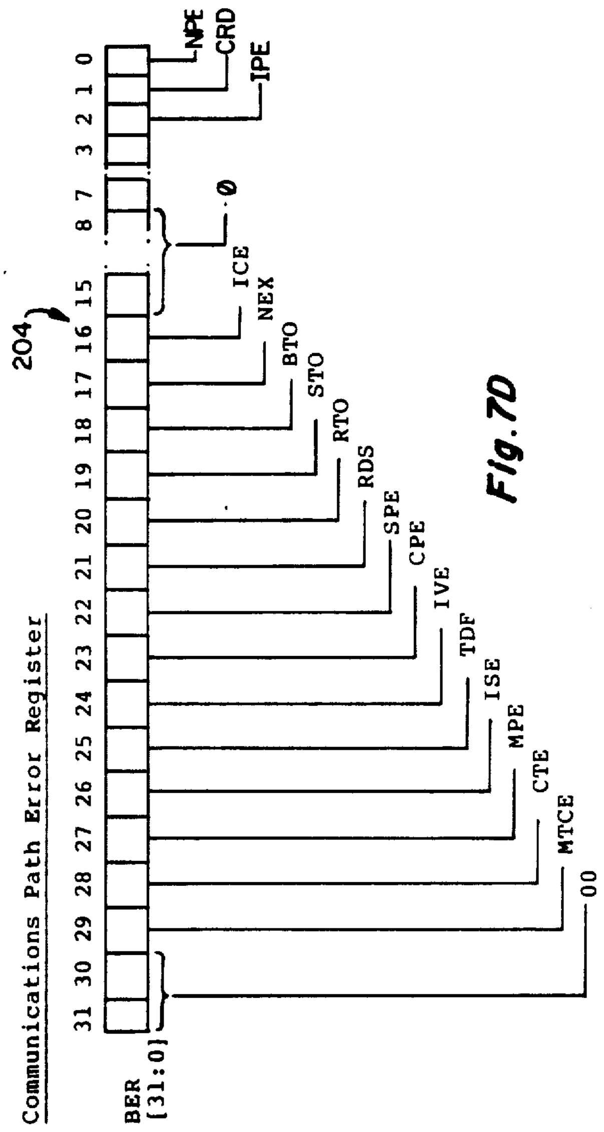
FIG. 7D is a more-detailed diamgram of the communications-path error register, showing the specific utilization of varios bits within that register.

The Stop transaction is illustrated in FIG. 4G. It facilitates diagnosis of failed systems by stopping further generation of transactions by selected devices while allowing them to continue responding as Slaves. Devices selected by a Stop Transaction must abort any Pending Master state and deassert NO ARB. In order to facilitate error diagnosis, it is preferred that such devices maintain at least certain minimum information concerning error conditions existing at the time of the Stop Transaction. For example, it is desirable that the information contained in Communications Path Error Register 204 (FIG. 7D) be maintained for subsequent analysis.

During the Command/Address cycle, the Current Master performing a Stop transaction asserts the appropriate command on information lines I[3:0] and asserts a destination mask on data lines D[31:0]. The mask comprises a number of bits which, when set, identify the devices which are to be stopped. The Command/Address cycle is followed by the usual Imbedded Arbitration cycle and a data cycle during which no inforamtion is transmitted. The information transmitted during the Command/Address cycle is confirmed two cycles later by all devices selected by the Stop transaction.

Broadcast Transaction

The Broadcast transaction, illustrated in FIG. 4H, offers a convenient means of broadly notifying devices on the communications path of significant events while avoiding the overhead costs of Interrupt transactions. During the Command/Address cycle of the transaction, the Current Master initiating the Broadcast transaction asserts the appropriate command code on Information lines I[3:0] and places a two-bit data length code on data lines D[31:30]. At the same time, it places a destination mask on data lines D[15:0]. This mask specifies the devices which are selected by the broadcast transaction. For example, a "one" bit asserted on data lines 2, 3, 5, 9, 12, 13, and 14 will select devices 2, 3, 5, 9, 12, 13, and 14 for receipt of the Broadcast. The Command/Address cycle is followed by the usual Imbedded Arbitration cycle which in turn is followed by one or more data cycles. For purposes of illustration only, two data cycles are shown. The data itself is asserted on data lines D[31:0] by the Master. As with Write-type transactions, the Slaves issue either ACK or NO ACK two cycles later.

Register Complement

FIG. 7A shows the register file contained in the present implementation of the interconnecting means. These comprise a Device-Type Register 200, a Control and Status Register 202, a Bus Error Register 204, an Error Interrupt Control Register 206, an Error Vector Register 208, an Interrupt Destination Register 210, an Interprocessor Interrupt Mask Register 212, an Interprocessor Interrupt Destination Register 214, and an Interprocessor Interrupt Source Register 216. These registers comprise both 32 bit registers (e.g., registers 200, 204) and 16 bit registers (e.g., registers 202, 206, 208, 210, 212, 214 and 216.

In the Device-Type Register 200, (FIG. 7B), the code for the device-type is stored in the lower half (DTR[15:0]) of the register. The device-type is loaded into this register on system power-up or on subsequent initialization of the system. This register may be interrogated by other elements in the system, usually a processor, to determine what devices are connected to the system for purposes of optimizing and dynamically rearranging, the system configuration. A Revision Code field (DTR[31:16]) is provided for in the upper half of the Device-Type register.

The Control and Status Register 202 contains a number of bits indicating the status of various conditions within the device, as well as within the interconnecting means to which it is attached. Additionally, it stores information utilized in arbitrating for control of the communications path. Thus, bits CSR[3:0] store the encoded form of the device ID which also is loaded into this register on power up or on subsequent initialization.

Bits CSR[5:4] specify the arbitration mode in which the device will arbitrate. As described earlier, these modes comprise "Dual Round Robin", Fixed High, Fixed Low, and Arbitration Disabled modes. On power up or on subsequent Initialization, the arbitration mode is set to "dual round robin." However, this mode may be changed by writing to these bits during system operation.

CSR[7] and CSR[6] are Hard Error Interrupt Enable and Soft Error Interrupt Enable bits, respectively. When set, they enable the device to generate an Interrupt transaction (referred to hereafter as an Error Interrupt transaction) whenever the Hard Error Summary Bit CSR[15] or Soft Error Summary bit CSR[14], respectively, are set. These latter bits are set when a hard or a soft error, respectively, is detected. A "hard" error is one which affects the integrity of data on this system; for example, a parity error detected on the data lines during transmission of data is a hard error. Conversely, a "soft" error is one which does not affect the integrity of the data in the system; for example, a parity error detected on the Identification I[3:0] lines during the Imbedded Arbitration cycle may lead to an incorrect calculation by a device but will not affect the integrity of data on the communcations path. Accordingly, it is a soft error.

The Unlock Write Pending bit CSR[8] indicates that an Interlock Read transaction has been successfully transmitted by the device but that a subsequent Unlock Write Mask with Cache Intent command has not yet been transmitted. Start Self Test bit CSR[10], when set, initiates a self test which checks out the operation of the interconnect logic. The Self Test status CSR[11] remains reset until the self test has been successfully completed, at which time the STS bit is set to indicate successful completion of the test. The Broke bit CSR[12] is also set if the device has failed its self test.

The Initialization bit CSR[13] is used in conjunction with system initialization. For example, it may be used as a status indicator while the device is undergoing Initialization. CSR[23:16] specifies the particular design of the interconnecting means. Bits CSR[31:24] are presently not used.

The Bus Error Register 204 records various error conditions during system operation. The Null Parity Error bit BER[0], the Corrected Read Data Bit BER[1] and the ID Parity Error Bit BER[2] records soft errors, while the remaining bits record hard errors. The Null Parity Error Bit is set if incorrect parity was detected during the second cycle of a two-cycle sequence during which NO ARB and BSY were deasserted. The Corrected Read Data bit is set if a Corrected Read Data Status Code is received in response to a Read-type transaction. The ID parity error bit is set if a parity error is detected on the I[3:0] lines carrying the encoded Master ID during an Imbedded Arbitration cycle.

Illegal Confirmation Error bit BER[16] indicates receipt of an illegal confirmation code during a transaction. Nonexistent Address bit BER[17] is set on receipt of a NO ACK response to a read-type or write-type command. Bus timeout bit BER[18] is set if a Pending Master ever waits more than a predetermined number of cycles to assume control of the interconnect. In the specific implementation described herein, a timeout of 4096 cycles is implemented. STALL timeout bit BER[19] is set if a responding (Slave) device asserts STALL on the response lines CNF[2:0] for more than a predetermined number of cycles. In the present implementation, the stall timeout occurs after 128 cycles. The RETRY timeout bit BER[20] is set if a Current Master receives a predetermined number of consecutive RETRY responses from a Slave with which it is communicating. In the present implementation, this timeout is set for 128 consecutive RETRY responses.

The Read Data Substitute Bit BER[21] is set if a data status comprising a Read Data Substitute or a Reserved Status Code is received during a Read-type or Identify transaction and there has been no parity error during this cycle. The Slave Parity Error bit BER[22] is set when a Slave detects a parity error on the communication path during a data cycle of a Write-type or Broadcast transaction. The Command Parity Error bit BER[23] is set when a parity error is detected during a Command/Address cycle.

The Identify Vector error bit BER[24] is set by a Slave on receipt of any confirmation code other than ACK from the Master Identify transaction. The Transmitter During Fault bit BER[25] is set if a device was asserting information on the data and information lines (or, during Imbedded Arbitration, just on the information lines) during a cycle resulting in the setting of the SPE, MPE, CPE, or IPE bit. The Interlock Sequence Error Bit BER[26] is set if a Master successfully transmitted a Write Unlock transaction without having previously transmitted the corresponding Interlock Read transaction. The Master Parity Error bit BER[27] is set if the Master detects a parity error during a data cycle having an ACK confirmation on the CNF[2:0] lines. The Control Transmit Error bit BER[28] is set when a device detects a deasserted state on the NO ARB, BSY, or CNF lines at a time when the device is attempting to assert these lines. Finally, the Master Transmit Check Error bit BER[29] is set when the data that the Master is attempting to assert on the Data, Information or Parity lines fails to match the data actually present on these lines. However, the assertion of the Master ID during an Imbedded Arbitration is not checked.

Figure 7E:
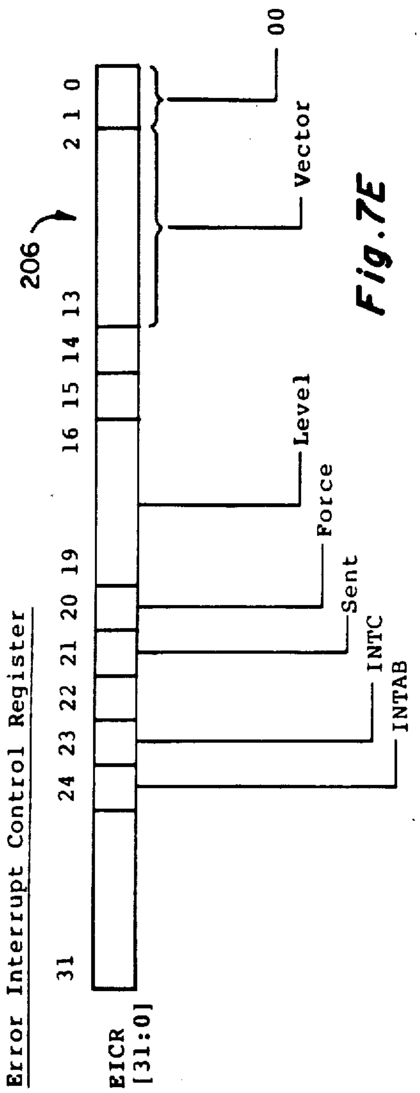
FIG. 7E is a more-specific diagram of the error-interrupt control register, showing the specific utilization of various bits within that register.

Turning now to FIG. 7E, the structure of the Error Interrupt Control Register 206 is shown in detail. When a bit is set in the Bus Error Register, and the appropriate Error Interrupt Enable bit is set in the Control and Status Register, or when the force bit is set in the Error Interrupt Control Register, an Error Interrupt will occur. Bits EICR[13:2] contain the Error Interrupt Vector. If the Force bit EICR[20] is set, the interconnecting means will generate an Error Interrupt transaction at the levels specified by bits EICR[19:16]. The Sent bit EICR[21] is set after an Error Interrupt has been transmitted. When set, it prevents the generation of further interrupts by this register. This bit is reset on losing an Interrupt Arbitration for the Error Interrupt. The Interrupt Complete Bit EICR[23] is set on successful transmission of the Error Interrupt Vector.

The Interrupt Abort bit EICR[24] is set if an Error Interrupt transaction is not successful.

Figure 7F:
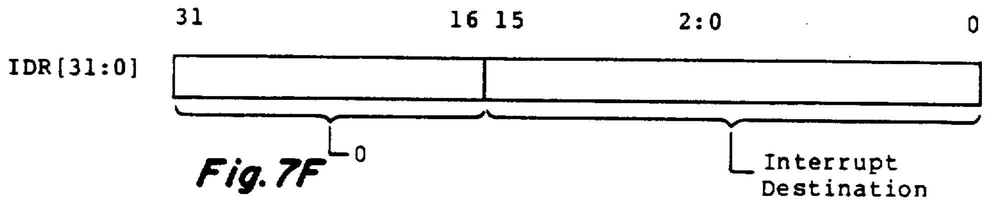
FIG. 7F is a more-specific diagram of the interrupt-destination register, showing the specific utilization of various bits within that register.

Turning now to FIG. 7F, the Interrupt Destination Register 210 contains an interrupt destination field IDR[15:0] which identifies which devices are to be selected by interrupt commands originated by this device, as previously described.

Figure 7G:
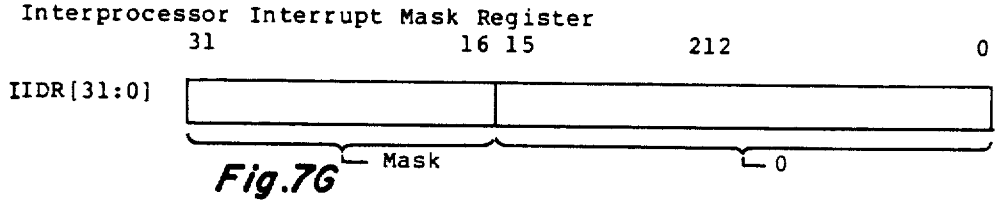
FIG. 7G is a more-detailed, diagram of the inter-processor-interrupt-mask register, showing the specific utilization of various bits within that register.
Figure 7H:
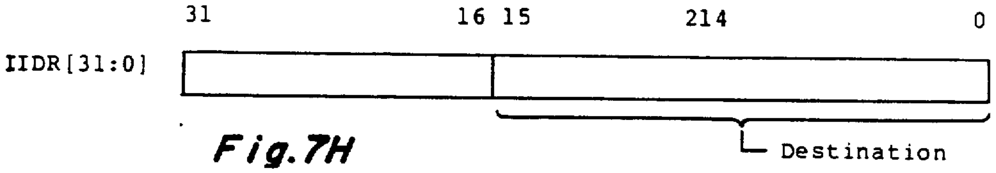
FIG. 7H is a more-specific diagram of the inter-processor-interrupt-destination register, showing the specific utilization of various bits within that register.
Figure 7I:
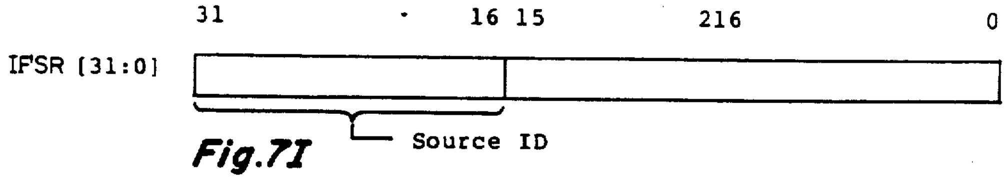
FIG. 7I is a more-specific diamgram of the inter-processor-interrupt-source register, showing the specific utilization of various bits within that register.

The Interprocessor Interrupt Mask Register 212 is shown in FIG. 7G. This register contains a Mask Field IIMR[31:16] which identifies devices from which interprocessor interrupts will be accepted. Similarly, the interprocessor interrupt destination register 214 contains a destination field IIDR[15:0] which identifies devices to which interprocessor interrupt commands are to be directed. Finally, the Interprocessor Interrupt Source Register 216 contains a source identification field IISR[31:16], which stores the decoded ID of a device sending an interprocessor interrupt command to this device provided the ID of the sending device matches a bit in the Interprocessor Interrupt Mask Register of this device.

2. Further Specific Description of the Retry Mechanism

The Retry response described above increases system performance by allowing devices to cause termination of operations which might otherwise require excessive time to complete on "interlocked type" communications paths. In an "interlocked type" path, once control is granted to perform a transaction, the transaction must continue to completion. In addition, it increases system flexibility in providing a means of adapting to other buses or dual port memories. Some situations in which the capabilities provided by this transaction are especially useful are shown in FIGS. 8A through 8D.

Figure 8A:
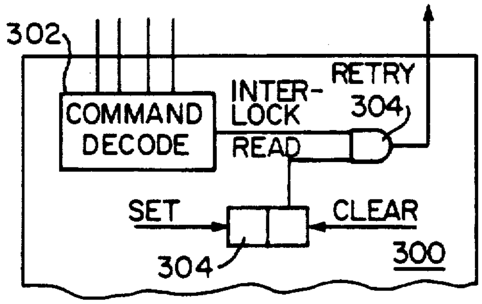
FIGS. 8A–8D are block diagrams of devices that implement the retry mechanism of the present invention.
Figure 8C:
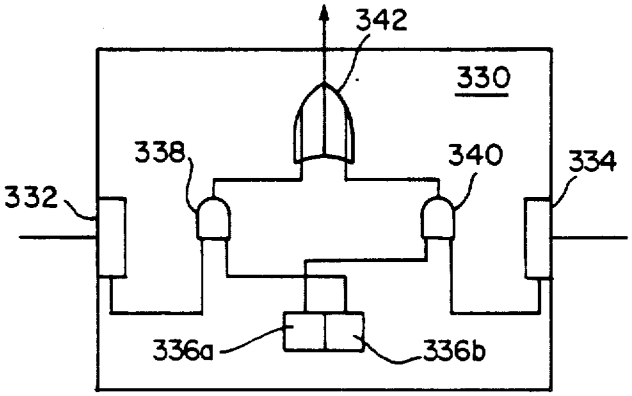

In FIG. 8A, a device 300 has a Command Decode unit 302, an Interlock Bit Register 304 and an AND gate 306. The Command Decode unit 302 produces an output to gate 306 whenever an INTERLOCK READ command is received by the device. The INTERLOCK READ command also sets register 304. The register is cleared by a subsequent Unlock command, such as UNLOCK WRITE. For purposes of illustration only, the register shown is "set" only after completion of a successful Interlock Read transaction.

When a second INTERLOCK command is received prior to an UNLOCK WRITE to the device, register 304 is set and AND gate 306 is thereby enabled. The output of Command decode unit 302 is then applied to gate 306 to cause this gate to generate an output which may then serve as a RETRY response. This response is returned to the Current Master as part of the Command Confirmation, as previously described. The Master then terminates the transaction in a manner similar to receiving a NO ACK response, and may seek to RETRY the transaction at a subsequent time or may take other action as appropriate.

Figure 8D:
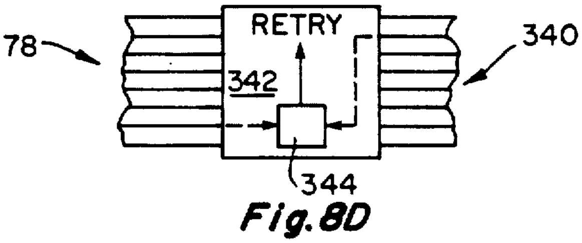
Figure 8B:
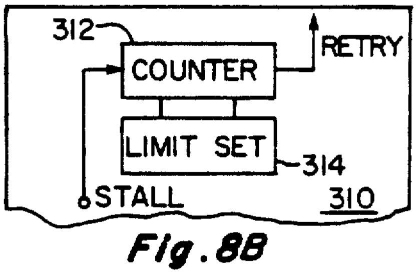

An example of the use of the RETRY response in place of the STALL response is illustrated in FIG. 8B, which shows a device 310 having a counter 312 and a limit setting unit 314. The counter 312 counts the number of times the STALL response is asserted by the device. When this number exceeds a predefined limit set in the unit 314, the latter provides an output which serves as a RETRY response. This response is transmitted to the Master to cause termination of the transaction with respect to which the device 310 is communicating with the Master. The use of the RETRY as illustrated in FIG. 8B is appropriate when it is possible that the device might be able to perform the operation requested by the transaction, provided that the transaction is extended by a limited number of cycles. Placing an upper limit on the number of possible STALL assertions allows the device to attempt to respond within a certain time but prevents it from holding the communications path beyond this time. This "frees up" the communications path and allows transactions generated by other devices to proceed. The device may then complete the transaction with a lower number of STALLS on a further access attempt by the Master.

Dual port memories are often used to enhance system performance in multiprocessor systems. Such systems allow access to the memory from either of two ports. Under certain circumstances, this may cause problems, unless appropriate precautions are taken. For example, where a sequence of transactions may be expected to change stored data at some time after the first transaction occurs but before the last transaction is completed, it is necessary to restrict access to the data by other devices until the change can be accomplished. This is the case, for example, read-modify-write operations use a sequence of transactions to perform the desired operation. The RETRY response is particularly useful in this situation. Thus, in FIG. 8C, a dual port memory 330 has a first access port 332 and a second access port 334. A Port Access Register 336 has a first register section 336*a* which records current utilization of the memory through port 332, and a second register section 336*b* which records current utilization of the memory through port 334. A first AND gate 338 is enabled by register section 336*b*. Gate 338 receives a second input from port 332 whenever this port is accessed by a device for a transaction. Similarly, a second AND gate 340 is enabled by register 336*a*, and receives an input from port 334 when the later is accessed. The output of gates 338 and 340 is applied to an OR Gate 342.

When port 332 is accessed by a device seeking to perform an interlock type transaction such as an Interlock Read, register 336*a* records that fact, e.g., by setting a status bit; this enables AND gate 340. If port 334 is now accessed, gate 340 generates an output which serves as a Retry response to the device seeking access to the memory 330 via port 334. The device seeking access then terminates its transaction as previously described. A similar result is obtained when port 334 is accessed by a device seeking to perform an Interlock-type sequence and port 332 is thereafter accessed while the interlock condition is still in effect.

The increasing need for communication between devices has greatly multiplied the need for interconnecting the differing "interlocked" communication paths used by such devices. Such paths are typically controlled from independent control sources imposing differing constraints on the paths. When interconnected, it is possible that each path may seek access to the other path at the same time but for wholly different operations. When this occurs, both paths may "hang up", with consequent adverse consequences for communications efficiency. The Retry response procedure of the present invention provides an extremely simple and thus efficient mechanism for resolving the dispute among the contending communications paths.

Thus, as illustrated in FIG. 8D, a communications path 78 of the present invention is connected to a separate communications path 340 via an interface 342. Interface 342 includes a controller 344 which monitors one or more signal lines on each path to determine when that path is being used. For example, the controller 344 monitors for selection as Slave on communications path 78 to determine whether that path is currently being accessed by path 340 for a transaction. Similarly, the controller monitors the appropriate one or more signals on path 340 for the same purpose. On detecting coincident requests for connection to the other path, the controller 344 generates a RETRY command which is returned on the communications path 78 during the command confirmation response cycle of the transaction seeking control of the path 340. This signals the device seeking control of path 340 that the latter path is currently occupied and thus appropriate action may be taken.

Conclusion

The RETRY mechanism described herein provides an efficient means of releasing the communications path when a device engaging in a transaction is unable to complete the transaction without requiring an excessive delay. This may arise from a need for a long access time by the responding device or may arise from other factors, e.g., the need to insure that a certain operation (e.g., a read-modify-write operation) requiring a sequence of transactions is completed before other transactions should be allowed. Further, the RETRY mechanism is useful in helping to limit the extent to which a transaction may be extended by other responses. Finally, it is particularly useful in facilitating transactions between "interlocked" types of communications paths.

I claim:

1. For connection to a common communications path in a data processing system, which path carries data signals that represent data being read or written, the path including address lines for carrying signals that designate memory location from which data are to be read, command lines for carrying commands, including interlock-read commands that request that data be read from a memory location designated by the address signals and unlock-write commands that request that data be written into a memory location designated by the address signals, and response lines for carrying one of at least three response signals, namely, an acknowledgement signal, a no-acknowledgement signal that results when no device places signals on the response lines, and a retry signal, a memory device comprising:

A. acknowledgement means including at least one interlock-bit register, each interlock-bit register being associated with at least one address, being arranged selectively to assume one of a retry-enabled state and a retry-disabled state, and, when the memory device is connected to the common communications path, being responsive to address signals representing the address associated therewith to:

(i) assume its retry-enabled state when it receives an interlock-read command and it is in its retry-disabled state; and (ii) assume its retry-disabled state when it receives an unlock-write command and it is in its retry-enabled state, said acknowledgement means responding to the presence on the common communications path of an interlock-read command and an address associated with any included interlock-bit register thereof to:

(i) place retry signals on the common communications path when the interlock-bit register associated with the address signals on the common communications path is in its retry-enabled state; and (ii) place acknowledgement signals on the common communications path when the interlock-bit register associated with the address signals on the common communications path is in its retry-disabled state; and B. a plurality of memory locations for containing data, each memory location associated with an address and, when the memory device is connected to the common communications path:

(i) being responsive to the presence on the common communications path of the address associated therewith, to an interlock-read command, and to the state of the interlock bit associated with the address of that memory location to place on the common communications path data signals representing the data stored in that location if the interlock-bit register associated with the address of that location is in its retry-disabled state and to refrain from placing on the common communications path via signals representing the data stored in that location if the interlock-bit register associated with the address of that location is in its retry-enabled state, and (ii) further being responsive to its address on the common communications path and to an unlock-write command to store therein data represented by data signals carried by the common communications path.

2. For connection to a common communications path in a data processing system, which path includes lines for carrying commands that specify a transaction to be performed, for carrying stall signals that request extension of the length of the transaction, for carrying no-acknowledgement signals that cause termination of the transaction in one way, and for carrying retry signals that cause termination of the transaction in another way, a slave device comprising:

A. transaction means responsive to a command from a master device on the common communications path for performing a transaction with the master device that has placed the command on the path when the slave device is connected to the common communications path;

B. stall means responsive to the transaction means for placing a stall signal on the communications path during the device's performance of the transaction specified by the command signal when the slave device is connected to the common communications path if the time required by the transaction means to complete a step of that transaction is more than an allotted period of time; and C. retry means for monitoring the stall means to keep track of how long the device has asserted the stall signal and for placing the retry signal on the common communications path when the device has asserted the stall signal for more than a predetermined maximum time.

3. A data processing system comprising:

A. a common communications path;

B. at least one master device including:

i. means for (a) initiating at least some read transactions by placing on the common communications path address signals to designate a memory location from which data are to be read and interlock-read commands to request that data be read from a memory location designated by the address signals and (b) initiating at least some write transactions by placing on the common communications path address signals to designate a memory location in which data are to be written, placing on the common communications path data to be stored, and placing on the common communications path unlock-write commands that request that the data placed on the common communications path be stored in the addressed location;

ii. means for monitoring the common communications path, after the initiating means initiates a read transaction, for one of at least three response signals, namely, an acknowledgement signal, a no-acknowledgement signal, and a retry signal;

iii. means for completing the read transaction in response to the acknowledgement signal;

iv. means for terminating the transaction in one manner in response to the no-acknowledgement signal; and v. means for terminating the transaction in a different manner in response to the retry signal; and C. a memory device comprising:

i. acknowledgement means including at least one interlock-bit register, each interlock-bit register being associated with at least one address and being arranged selectively to assume one of a retry-enabled state and a retry-disabled state and being responsive to address signals representing the address associated therewith to (a) assume its retry-enabled state when it receives an interlock-read command in its retry-disabled state and (b) assume its retry-disabled state when it receives an unlock-write command and it is in its retry-enabled state, said acknowledgement means responding to the presence on the common communications path of an interlock-read command and an address associated with any included interlock-bit register thereof to (a) place retry signals on the common communications path when the interlock-bit register associated with the address signals on the common communications path is in its retry-enabled state, and (b) place acknowledgement signals on the common communications path when the interlock-bit register associated with the address signals on the common oommunications path is in its retry-enabled state; and ii. a plurality of memory locations for containing data, each memory location being associated with an address, being responsive to its address on the common communications path, to an interlock-read command, and to the state of the interlock bit associated with the address of that memory location to place on the common communications path data signals representing the data stored in that location if the state of the interlock-bit register associated with its address is in its retry-disabled state and to refrain from placing on the common communications path data signals representing the data stored in that location if the state of the interlock-bit register associated with its address is in its retry-enabled state, each memory location further being responsive to its address on the common communications path and to an unlock-write command to store therein data represented by data signals placed on the common communications path by a master device.

4. A data processing system comprising:

A. a common communication path;

B. at least one master device connected to the common communications path and including:

i. means for initiating a transaction by placing a command on the common communications path;

ii. means for performing the transaction for a predetermined transaction time associated with that transaction;

iii. means for extending the transaction time in response to the presence of a predetermined stall signal on the common communications path;

iv. means for terminating the transaction in one way in response to the presence of a no-acknowledgement signal on the common communications path, and v. means for terminating the transaction in another way in response to the presence of a retry signal on the common communications path; and C. a slave device comprising:

i. transaction means responsive to a command from a master device on the common communications path for performing a transaction with the master device that has placed the command on the path;

ii. stall means responsive to the transaction means for placing a stall signal on the communications path during the device's performance of the transaction specified by the command signal if the time required by the transaction means to complete a step of that transaction is more than an allotted period of time; and iii. retry means for monitoring the stall means to keep track of how long the device has asserted the stall signal and for placing the retry signal on the common communications path when the device has asserted the stall signal for more than a predetermined maximum time.

* * * * *

UNITED STATES PATENT AND TRADEMARK OFFICE

CERTIFICATE OF CORRECTION

PATENT NO. : 4,706,190

DATED : November 10, 1987

INVENTOR(S) : FRANK C. BOMBA AND STEPHEN R. JENKINS

It is certified that error appears in the above-identified patent and that said Letters Patent is hereby corrected as shown below:

On the Title Page, in the Title [54], after "IN" insert --A-- so to read as follows:

--RETRY MECHANISM FOR RELEASING CONTROL OF A COMMUNICATIONS PATH IN A DIGITAL COMPUTER SYSTEM--.

IN THE SPECIFICATION

Column 1, line 12, change "circiutry" to --circuitry--.

Column 4, line 44, change "reson" to --reason--;

line 47, change "commuications" to --communications--;

line 55, delete "of a master" (second occurrence);

lines 56 and 57, change "no-achnowledgment" to --no-acknowledgment--;

line 57, change "ordinally" to --ordinarily--; and line 62, change "wiht" to --with--.

Column 5, line 62, change "interporcessor-interrupt" to --interprocessor-interrupt--.

Column 6, line 16, change "diamgram" to --diagram--;

line 18, change "varios" to --various--;

line 31, change "diamgram" to --diagram--; and line 41, change "cofnguration" to --configuration--.

UNITED STATES PATENT AND TRADEMARK OFFICE
CERTIFICATE OF CORRECTION

PATENT NO. : 4,706,190

DATED : November 10, 1987

INVENTOR(S) : FRANK C. BOMBA AND STEPHEN R. JENKINS

It is certified that error appears in the above-identified patent and that said Letters Patent is hereby corrected as shown below:

Column 17, line 64, change "fourth" to --third--.

IN THE CLAIMS

Claim 1, column 27, line 17, after "location" insert --being--; and line 30, change "via" to --data--.

IN THE DRAWINGS

Figure 4B, change "Data2" (second occurrence) to --Data3--.

Figure 8A, change "304" (upper right occurrence) to --306--.

Signed and Sealed this

Eighteenth Day of October, 1988

*Attest:*

DONALD J. QUIGG

*Attesting Officer*

*Commissioner of Patents and Trademarks*